(12) United States Patent
   Sun

(10) Patent No.:    US 12,574,649 B2
(45) Date of Patent:       Mar. 10, 2026

(54) ENCODING AND DECODING METHOD, ELECTRONIC DEVICE, COMMUNICATION SYSTEM, AND STORAGE MEDIUM

(71) Applicant: Huawei Technologies Co., Ltd., Shenzhen (CN)

(72) Inventor: Wei Sun, Beijing (CN)

(73) Assignee: Huawei Technologies Co., Ltd., Shenzhen (CN)

( * ) Notice:    Subject to any disclaimer, the term of this patent is extended or adjusted under 35 U.S.C. 154(b) by 58 days.

(21) Appl. No.:    18/270,294

(22) PCT Filed:    Dec. 16, 2021

(86) PCT No.:    PCT/CN2021/138939
      § 371 (c)(1),
      (2) Date:    Aug. 6, 2024

(87) PCT Pub. No.:    WO2022/143205
      PCT Pub. Date: Jul. 7, 2022

(65)            Prior Publication Data
      US 2025/0016454 A1       Jan. 9, 2025

(30)        Foreign Application Priority Data

Dec. 31, 2020    (CN) .......................... 202011633834.8

(51) Int. Cl.
      *H04N 23/698*        (2023.01)
      *H04N 19/105*        (2014.01)
                (Continued)

(52) U.S. Cl.
      CPC ......... *H04N 23/698* (2023.01); *H04N 19/119* (2014.11); *H04N 19/167* (2014.11);
                (Continued)

(58) Field of Classification Search
      None
      See application file for complete search history.

(56)            References Cited

U.S. PATENT DOCUMENTS 9,407,902 B1 *    8/2016    Cole .................... H04N 19/597
   10,609,356 B1 *    3/2020    Waggoner ...... H04N 21/440281
                (Continued)

FOREIGN PATENT DOCUMENTS

CN        101895748 A        11/2010
   CN        102946570 B        3/2015
                (Continued)

*Primary Examiner* — Hung Q Dang
(74) *Attorney, Agent, or Firm* — Slater Matsil, LLP

(57)            ABSTRACT

An encoding and decoding method, an electronic device, a communication system, and a storage medium are provided. The encoding method includes enabling a first camera lens and a second camera lens after an image shooting instruction sent by a second device is received; encoding a first panoramic image to obtain a first compressed image, where the first panoramic image is any image in a first panoramic image stream. Obtaining a first difference image based on the first panoramic image and a first close-up image, where the first close-up image is an image that is in a first close-up image stream and that is collected synchronously with the first panoramic image. Encoding the first difference image to obtain a second compressed image, and sending the first compressed image and the second compressed image to the second device.

20 Claims, 20 Drawing Sheets

Stream 201    Stream 202    302    Panoramic image stream 201    A wide-angle camera lens 101 collects an image
301    Stream 203    303    Close-up image stream 202    A primary camera lens 102 collects an image
                Close-up image stream 203    A telephoto camera lens 103 collects an image Remote device 10

Local device 20

(51) Int. Cl.

| | |
|---|---|
| *H04N 19/119* | (2014.01) |
| *H04N 19/132* | (2014.01) |
| *H04N 19/136* | (2014.01) |
| *H04N 19/167* | (2014.01) |
| *H04N 19/172* | (2014.01) |
| *H04N 19/182* | (2014.01) |
| *H04N 19/187* | (2014.01) |
| *H04N 19/30* | (2014.01) |
| *H04N 19/46* | (2014.01) |
| *H04N 19/59* | (2014.01) |
| *H04N 19/597* | (2014.01) |
| *H04N 19/85* | (2014.01) |
| *H04N 23/45* | (2023.01) |
| *H04N 23/57* | (2023.01) |
| *H04N 23/61* | (2023.01) |
| *H04N 23/69* | (2023.01) |
| *H04N 23/80* | (2023.01) |
| *H04N 23/90* | (2023.01) |

(52) U.S. Cl.
CPC .......... *H04N 19/172* (2014.11); *H04N 23/61* (2023.01); *H04N 23/69* (2023.01)

(56) References Cited

U.S. PATENT DOCUMENTS

| | | | |
|---|---|---|---|
| 2002/0129374 A1* | 9/2002 | Freeman ............ | H04N 21/4316 348/E7.071 |
| 2011/0157309 A1* | 6/2011 | Bennett .................. | H04S 7/303 348/43 |
| 2016/0337706 A1* | 11/2016 | Hwang ............ | H04N 21/23614 |
| 2017/0085917 A1 | 3/2017 | Hannuksela | |

FOREIGN PATENT DOCUMENTS

| | | | |
|---|---|---|---|
| EP | 3435655 | A1 | 1/2019 |
| EP | 3515082 | A1 | 7/2019 |

* cited by examiner 101
103
102

A wide-angle camera lens 101 collects an image
A primary camera lens 102 collects an image
A telephoto camera lens 103 collects an image Remote device 10

Panoramic image stream 201
Close-up image stream 202
Close-up image stream 203

302

303

Stream 202

Stream 203

Stream 201

301

Local device 20

Determine a second local area corresponding to a second close-up image on a second panoramic image          ⌐ S30

Capture the second local area from the second panoramic image, to obtain a second local image          ⌐ S31

Adjust a size of the second local image to be the same as a size of a second difference image, to obtain a second enlarged image          ⌐ S32

Determine the second close-up image based on the second enlarged image and the second difference image          ⌐ S33

FIG. 13

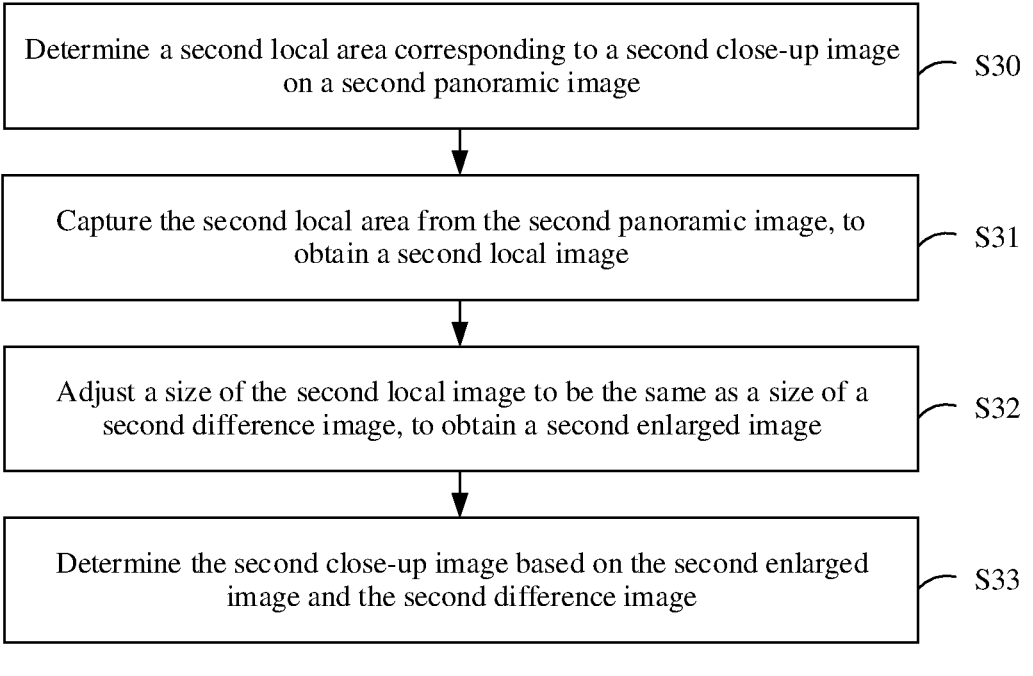

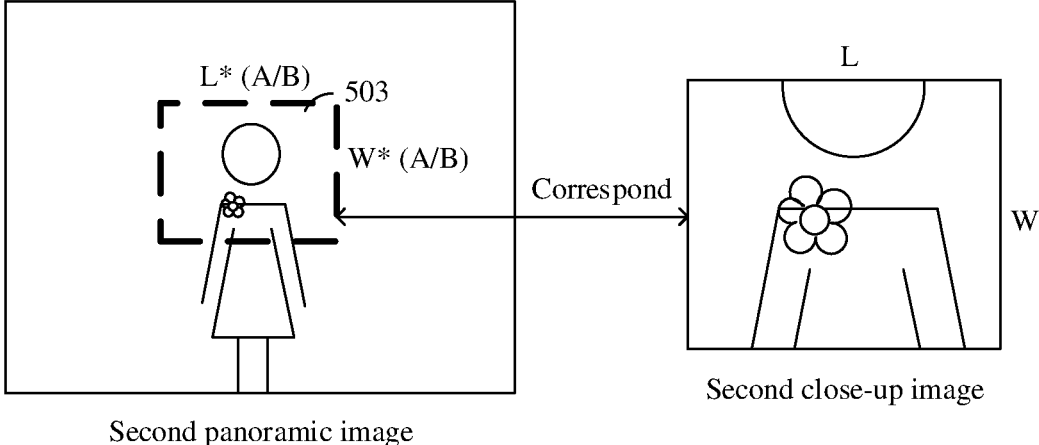

Second panoramic image

Second close-up image

FIG. 14A

Previous-frame image of a
second panoramic image

Second panoramic image

YUV=(A2=A1–A0, B2=B1–B0, C2=C1–C0)

Second close-up image

=

YUV=(A0, B0, C0)

Second difference image

–

YUV=(A1, B1, C1)

Second enlarged image

CONT.
FROM

FROM

FROM

FROM

Local device 20

Camera application 24

Camera control module 25

Decoding module 26

Decoding module 26

Decoding module 26

Second capture and amplifier module 27

Second capture and amplifier module 27

Close-up image recovery module 28

Close-up image recovery module 28

Stable frame rate output module 29

Data output module 30

Electronic device 100

ENCODING AND DECODING METHOD, ELECTRONIC DEVICE, COMMUNICATION SYSTEM, AND STORAGE MEDIUM

CROSS-REFERENCE TO RELATED APPLICATIONS

This application is a National Stage of International Application No. PCT/CN2021/138939, filed on Dec. 16, 2021, which claims priority to Chinese Patent Application No. 202011633834.8, filed on Dec. 31, 2020. The disclosures of the aforementioned applications are hereby incorporated by reference in their entireties.

TECHNICAL FIELD

Embodiments of this application relate to the field of terminal technologies, and in particular, to an encoding and decoding method, an electronic device, a communication system, and a storage medium.

BACKGROUND

When a local device needs to obtain a plurality of image streams by using a remote device, the local device may control, by using a network, the remote device to enable a plurality of camera lenses, and the remote device may send image streams collected by the camera lenses to the local device. Each image stream sent by the remote device to the local device has a large amount of data, but network bandwidth is limited. Therefore, the remote device needs to compress each image stream.

Because the camera lenses collect images synchronously, after the remote device compresses each image stream, I frames of compressed streams usually occur at the same time, and an amount of data of the I frames is large, resulting in an instantaneous increase of an amount of data transmitted in the network, and causing a display picture jitter of the local device. This affects user experience.

SUMMARY

Embodiments of this application provide an encoding and decoding method, an electronic device, a communication system, and a storage medium, to resolve a picture jitter problem caused by concurrent I frames.

According to a first aspect, an embodiment of this application provides a communication system, including a first device and a second device. The first device includes a first camera lens and a second camera lens. The first camera lens is configured to collect a first panoramic image stream, and the second camera lens is configured to collect a first close-up image stream. A picture of each close-up image in the first close-up image stream is a close-up of a local area on a synchronously collected panoramic image. The first device is configured to: enable the first camera lens and the second camera lens after receiving an image shooting instruction sent by the second device; encode a first panoramic image to obtain a first compressed image, where the first panoramic image is any image in the first panoramic image stream; obtain a first difference image based on the first panoramic image and a first close-up image, where the first close-up image is an image that is in the first close-up image stream and that is collected synchronously with the first panoramic image; encode the first difference image to obtain a second compressed image; and send the first compressed image and the second compressed image to the second device. The second device is configured to: decode the first compressed image to obtain a second panoramic image, decode the second compressed image to obtain a second difference image, and obtain a second close-up image based on the second panoramic image and the second difference image.

The first device is also referred to as a remote device in this embodiment of this application, and the second device is also referred to as a local device in this embodiment of this application. The first camera lens is also referred to as a panoramic camera lens in this embodiment of this application, and the second camera lens is also referred to as a close-up camera lens in this embodiment of this application.

In a possible implementation, the first device is specifically configured to: determine a first local area corresponding to the first close-up image on the first panoramic image; capture the first local area from the first panoramic image, to obtain a first local image; adjust a size of the first local image to be the same as a size of the first close-up image, to obtain a first enlarged image; and determine the first difference image based on the first enlarged image and the first close-up image.

In a possible implementation, the first device is specifically configured to: determine the first local area based on relative positions of the first camera lens and the second camera lens, a zoom multiple of the first camera lens, and a zoom multiple of the second camera lens.

In a possible implementation, the first device is specifically configured to: determine whether the relative positions change; and if the relative positions change, determine the first local area by using an image recognition algorithm; or if the relative positions do not change, determine whether the zoom multiple of the first camera lens and the zoom multiple of the second camera lens change; and if the zoom multiple of the first camera lens and/or the zoom multiple of the second camera lens change/changes, determine the first local area based on a current zoom multiple of the first camera lens and a current zoom multiple of the second camera lens; or if neither the zoom multiple of the first camera lens nor the zoom multiple of the second camera lens changes, determine the first local area based on a first area, where the first area is a local area corresponding to a previous-frame image of the first close-up image on a previous-frame image of the first panoramic image.

In a possible implementation, the first device is specifically configured to determine the first local area based on a central point of the first panoramic image, the size of the first close-up image, the current zoom multiple of the first camera lens, and the current zoom multiple of the second camera lens.

In a possible implementation, the first device is specifically configured to determine the first local area based on the first area, the current zoom multiple of the first camera lens, and the current zoom multiple of the second camera lens.

In a possible implementation, the first device is specifically configured to: determine a difference between color values of pixels based on color values of pixels on the first close-up image and color values of pixels on the first enlarged image; and obtain the first difference image based on the difference between color values of pixels.

In a possible implementation, the second device is specifically configured to: determine a second local area corresponding to the second close-up image on the second panoramic image; capture the second local area from the second panoramic image, to obtain a second local image; adjust a size of the second local image to be the same as a size of the second difference image, to obtain a second enlarged image; and determine the second close-up image based on the second enlarged image and the second difference image.

In a possible implementation, the second device is further configured to receive first local area information sent by the first device; and the second device is specifically configured to determine the second local area based on the first local area information.

In a possible implementation, the second device is further configured to: receive the current zoom multiple of the first camera lens and the current zoom multiple of the second camera lens that are sent by the first device; and the second device is specifically configured to determine the second local area based on the current zoom multiple of the first camera lens and the current zoom multiple of the second camera lens.

In a possible implementation, the second device is specifically configured to determine the second local area based on a central point of the second panoramic image, the size of the second difference image, the current zoom multiple of the first camera lens, and the current zoom multiple of the second camera lens.

In a possible implementation, the second device is specifically configured to determine the second local area based on a second area, the current zoom multiple of the first camera lens, and the current zoom multiple of the second camera lens. The second area is a local area corresponding to a previous-frame image of the second close-up image on a previous-frame image of the second panoramic image.

In a possible implementation, the first device is specifically configured to: determine a difference/sum of color values of pixels based on color values of pixels on the second difference image and color values of pixels on the second enlarged image; and obtain the second close-up image based on the difference/sum of color values of pixels.

According to a second aspect, an embodiment of this application provides an encoding method, applied to a first device. The first device includes a first camera lens and a second camera lens. The first camera lens is configured to collect a first panoramic image stream, and the second camera lens is configured to collect a first close-up image stream. A picture of each close-up image in the first close-up image stream is a close-up of a local area on a synchronously collected panoramic image. The method includes: enabling the first camera lens and the second camera lens after an image shooting instruction sent by a second device is received; encoding a first panoramic image to obtain a first compressed image, where the first panoramic image is any image in the first panoramic image stream; obtaining a first difference image based on the first panoramic image and a first close-up image, where the first close-up image is an image that is in the first close-up image stream and that is collected synchronously with the first panoramic image; encoding the first difference image to obtain a second compressed image; and sending the first compressed image and the second compressed image to the second device.

In a possible implementation, the obtaining a first difference image based on the first panoramic image and a first close-up image includes: determining a first local area corresponding to the first close-up image on the first panoramic image; capturing the first local area from the first panoramic image, to obtain a first local image; adjusting a size of the first local image to be the same as a size of the first close-up image, to obtain a first enlarged image; and determining the first difference image based on the first enlarged image and the first close-up image.

In a possible implementation, the determining a first local area corresponding to the first close-up image on the first panoramic image includes: determining the first local area based on relative positions of the first camera lens and the second camera lens, a zoom multiple of the first camera lens, and a zoom multiple of the second camera lens.

In a possible implementation, the determining the first local area based on relative positions of the first camera lens and the second camera lens, a zoom multiple of the first camera lens, and a zoom multiple of the second camera lens includes: determining whether the relative positions change; and if the relative positions change, determining the first local area by using an image recognition algorithm; or if the relative positions do not change, determining whether the zoom multiple of the first camera lens and the zoom multiple of the second camera lens change; and if the zoom multiple of the first camera lens and/or the zoom multiple of the second camera lens change/changes, determining the first local area based on a current zoom multiple of the first camera lens and a current zoom multiple of the second camera lens; or if neither the zoom multiple of the first camera lens nor the zoom multiple of the second camera lens changes, determining the first local area based on a first area, where the first area is a local area corresponding to a previous-frame image of the first close-up image on a previous-frame image of the first panoramic image.

In a possible implementation, the determining the first local area based on a current zoom multiple of the first camera lens and a current zoom multiple of the second camera lens includes: determining the first local area based on a central point of the first panoramic image, the size of the first close-up image, the current zoom multiple of the first camera lens, and the current zoom multiple of the second camera lens.

In a possible implementation, the determining the first local area based on a current zoom multiple of the first camera lens and a current zoom multiple of the second camera lens includes: determining the first local area based on the first area, the current zoom multiple of the first camera lens, and the current zoom multiple of the second camera lens.

In a possible implementation, the determining the first difference image based on the first enlarged image and the first close-up image includes: determining a difference between color values of pixels based on color values of pixels on the first close-up image and color values of pixels on the first enlarged image; and obtaining the first difference image based on the difference between color values of pixels.

According to a third aspect, an embodiment of this application provides a decoding method, including: decoding a first compressed image to obtain a second panoramic image; decoding a second compressed image to obtain a second difference image; and obtaining a second close-up image based on the second panoramic image and the second difference image.

In a possible implementation, the obtaining a second close-up image based on the second panoramic image and the second difference image includes: determining a second local area corresponding to the second close-up image on the second panoramic image; capturing the second local area from the second panoramic image, to obtain a second local image; adjusting a size of the second local image to be the same as a size of the second difference image, to obtain a second enlarged image; and determining the second close-up image based on the second enlarged image and the second difference image.

In a possible implementation, the method further includes: receiving first local area information sent by a first device; and the determining a second local area corresponding to the second close-up image on the second panoramic image includes: determining the second local area based on the first local area information.

In a possible implementation, the method further includes: receiving a current zoom multiple of a first camera lens and a current zoom multiple of a second camera lens that are sent by a first device; and the determining a second local area corresponding to the second close-up image on the second panoramic image includes: determining the second local area based on the current zoom multiple of the first camera lens and the current zoom multiple of the second camera lens.

In a possible implementation, the determining the second local area based on the current zoom multiple of the first camera lens and the current zoom multiple of the second camera lens includes: determining the second local area based on a central point of the second panoramic image, the size of the second difference image, the current zoom multiple of the first camera lens, and the current zoom multiple of the second camera lens.

In a possible implementation, the determining the second local area based on the current zoom multiple of the first camera lens and the current zoom multiple of the second camera lens includes: determining the second local area based on a second area, the current zoom multiple of the first camera lens, and the current zoom multiple of the second camera lens. The second area is a local area corresponding to a previous-frame image of the second close-up image on a previous-frame image of the second panoramic image.

In a possible implementation, the determining the second close-up image based on the second enlarged image and the second difference image includes: determining a difference/sum of color values of pixels based on color values of pixels on the second difference image and color values of pixels on the second enlarged image; and obtaining the second close-up image based on the difference/sum of color values of pixels.

According to a fourth aspect, an embodiment of this application provides an electronic device, including a memory, a processor, a first camera lens, and a second camera lens. The processor is coupled to the memory, and reads and executes instructions in the memory, to implement the method according to the second aspect. The first camera lens is configured to collect a first panoramic image stream, and the second camera lens is configured to collect a first close-up image stream. A picture of each close-up image in the first close-up image stream is a close-up of a local area on a synchronously collected panoramic image.

According to a fifth aspect, an embodiment of this application provides an electronic device, including a memory and a processor. The processor is coupled to the memory, and reads and executes instructions in the memory, to implement the method according to the third aspect.

According to a sixth aspect, an embodiment of this application provides a readable storage medium. The readable storage medium stores a computer program. When the computer program is executed, the method according to the second aspect or the third aspect is implemented.

According to the encoding and decoding method provided in this embodiment of this application, the picture of the close-up image is the close-up of the local area on the panoramic image, that is, content of the picture of the close-up image is consistent with content of the local area, and only image details are different. Therefore, an amount of data of the difference image is very small, and a picture jitter caused by concurrent I frames does not occur.

BRIEF DESCRIPTION OF THE DRAWINGS

FIG. 13 is a flowchart of obtaining a second close-up image according to an embodiment of this application;

FIG. 14A is a conceptual diagram 1 of determining a second local area according to an embodiment of this application;

DETAILED DESCRIPTION OF ILLUSTRATIVE EMBODIMENTS

To make objectives, technical solutions, and advantages of embodiments of this application clearer, the following clearly and completely describes the technical solutions in embodiments of this application with reference to the accompanying drawings in embodiments of this application. It is clear that the described embodiments are some embodiments of this application rather than all of the embodiments. All other embodiments obtained by a person of ordinary skill in the art based on embodiments of this application without creative efforts shall fall within the protection scope of this application.

First, some terms in embodiments of this application are explained.

Figures 1A, 1B:
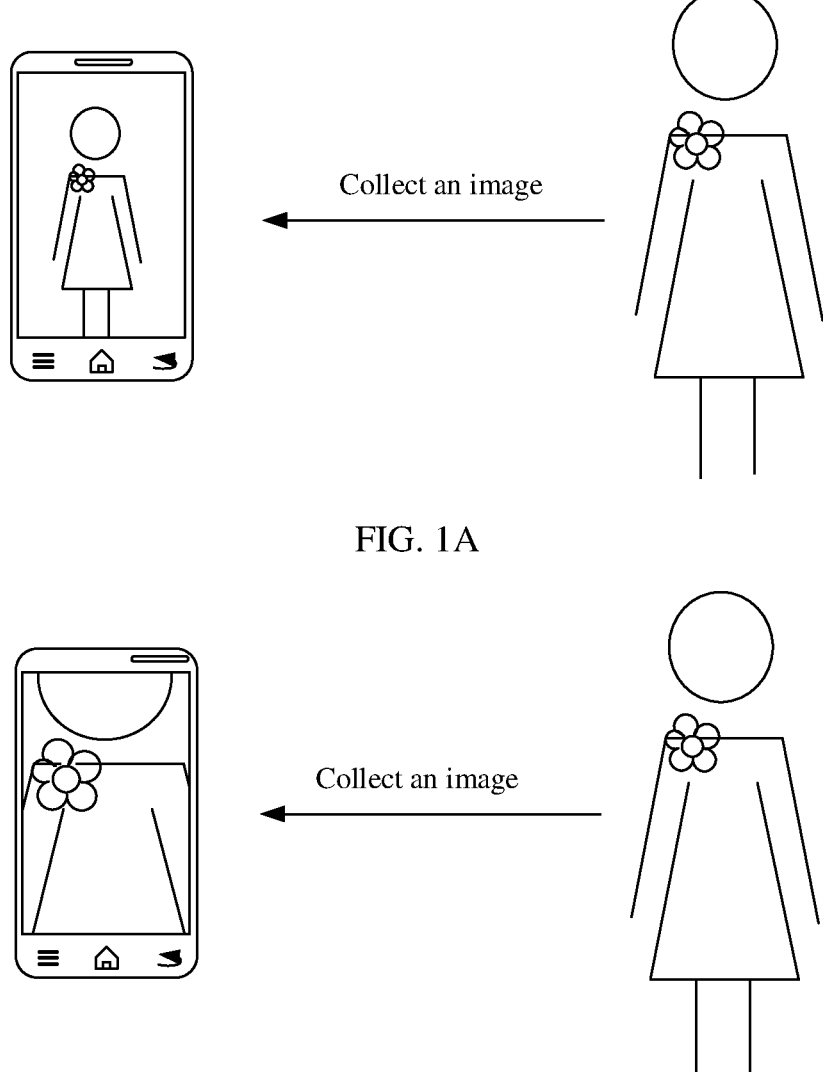
FIG. 1A is a schematic diagram of an image collected by a panoramic camera lens in an image shooting scenario according to an embodiment of this application.
FIG. 1B is a schematic diagram of an image collected by a close-up camera lens in the image shooting scenario shown in FIG. 1A according to an embodiment of this application.

A panoramic camera lens: Compared with a close-up camera lens, the panoramic camera lens has a larger field of view range and collects an image of a wider range. For example, FIG. 1A shows an image collected by the panoramic camera lens in an image shooting scenario.

A close-up camera lens: Compared with the panoramic camera lens, the close-up camera lens has a smaller field of view range and collects an image of a smaller range. For example, FIG. 1B shows an image collected by the close-up camera lens in the same image shooting scenario.

For ease of description, in embodiments of this application, an image collected by the panoramic camera lens is referred to as a panoramic image, and an image collected by the close-up camera lens is referred to as a close-up image. A picture of the close-up image is a close-up of a local area on the panoramic image.

Figure 1C:
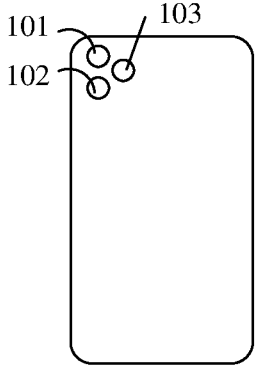
FIG. 1C is a schematic diagram of camera lenses according to an embodiment of this application.

For example, refer to FIG. 1C. A field of view range of a wide-angle camera lens 101 on a mobile phone is greater than that of a primary camera lens 102, and the field of view range of the primary camera lens 102 is greater than that of a telephoto camera lens 103. In this case, the wide-angle camera lens 101 may be used as the panoramic camera lens, and the primary camera lens 102 and/or the telephoto camera lens 103 may be used as the close-up camera lens. Alternatively, the primary camera lens 102 may be used as the panoramic camera lens, and the telephoto camera lens 103 may be used as the close-up camera lens. It should be noted that an arrangement manner of the camera lens in FIG. 1C is merely an example, and embodiments of this application are not limited thereto.

An I frame (I frame) is an image frame obtained by using a spatial compression (spatial compression) algorithm. When the I frame is decoded, a complete image can be reconstructed based on only data of the I frame.

A P frame is an image frame obtained by using a temporal compression (temporal compression) algorithm. When the P frame is decoded, a complete image can be reconstructed based on an image obtained after a previous P frame is decoded and data of a current P frame.

Figure 2:
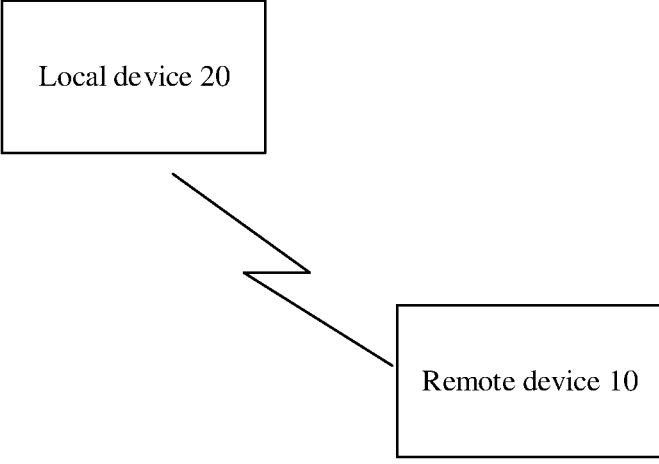
FIG. 2 is a diagram of a system architecture according to an embodiment of this application.

FIG. 2 is a diagram of a system architecture according to an embodiment of this application. The system architecture shown in FIG. 2 includes a remote device 10 and a local device 20. The remote device 10 and the local device 20 are connected by using a network. The remote device 10 includes a panoramic camera lens and a close-up camera lens.

The following describes several possible forms of the remote device 10.

In a possible implementation, the remote device 10 is a separate terminal device, a panoramic camera lens and a close-up camera lens are installed on the terminal device, and the terminal device includes but is not limited to a mobile phone. As described above, the wide-angle camera lens 101 on the terminal device may be used as the panoramic camera lens, and the telephoto camera lens 103 and/or the primary camera lens 102 on the terminal device may be used as the close-up camera lens. Alternatively, the primary camera lens 102 on the terminal device may be used as the panoramic camera lens, the telephoto camera lens 103 on the terminal device may be used as the close-up camera lens, and the terminal device is configured to interact with the local device 20.

In another possible implementation, the remote device 10 includes a terminal device and at least one single-lens reflex camera, and the terminal device is connected to the at least one single-lens reflex camera. A camera lens on the terminal device may be used as the panoramic camera lens, and a camera lens on the at least one single-lens reflex camera may be used as the close-up camera lens. The at least one single-lens reflex camera sends a collected close-up image stream to the terminal device. The terminal device is configured to interact with the local device 20.

Alternatively, a camera lens on the terminal device may be used as the close-up camera lens, a camera lens on one of the at least one single-lens reflex camera may be used as the panoramic camera lens, and a camera lens on another single-lens reflex camera may be used as the close-up camera lens. The at least one single-lens reflex camera sends a collected panoramic image stream and a collected close-up image stream to the terminal device. The terminal device is configured to interact with the local device 20.

In another possible implementation, the remote device 10 includes a plurality of single-lens reflex cameras, and the plurality of single-lens reflex cameras are connected to each other. A camera lens on one single-lens reflex camera may be used as the panoramic camera lens, and a camera lens on another single-lens reflex camera may be used as the close-up camera lens. After the plurality of single-lens reflex cameras are connected, a single-lens reflex camera configured to interact with the local device 20 may be determined through negotiation. Another single-lens reflex camera sends a collected image stream to the single-lens reflex camera. The single-lens reflex camera interacts with the local device 20.

For example, the remote device 10 includes two single-lens reflex cameras: a first single-lens reflex camera and a second single-lens reflex camera. A camera lens on the first single-lens reflex camera may be used as the panoramic camera lens, and a camera lens on the second single-lens reflex camera may be used as the close-up camera lens. It is determined through negotiation that the first single-lens reflex camera is configured to interact with the local device 20. The second single-lens reflex camera may send a collected close-up image stream to the first single-lens reflex camera. The first single-lens reflex camera interacts with the local device 20.

The local device 20 is a device having a display function, and a form of the local device 20 includes but is not limited to a mobile phone, a tablet computer, a laptop computer, or a television.

Figure 3:
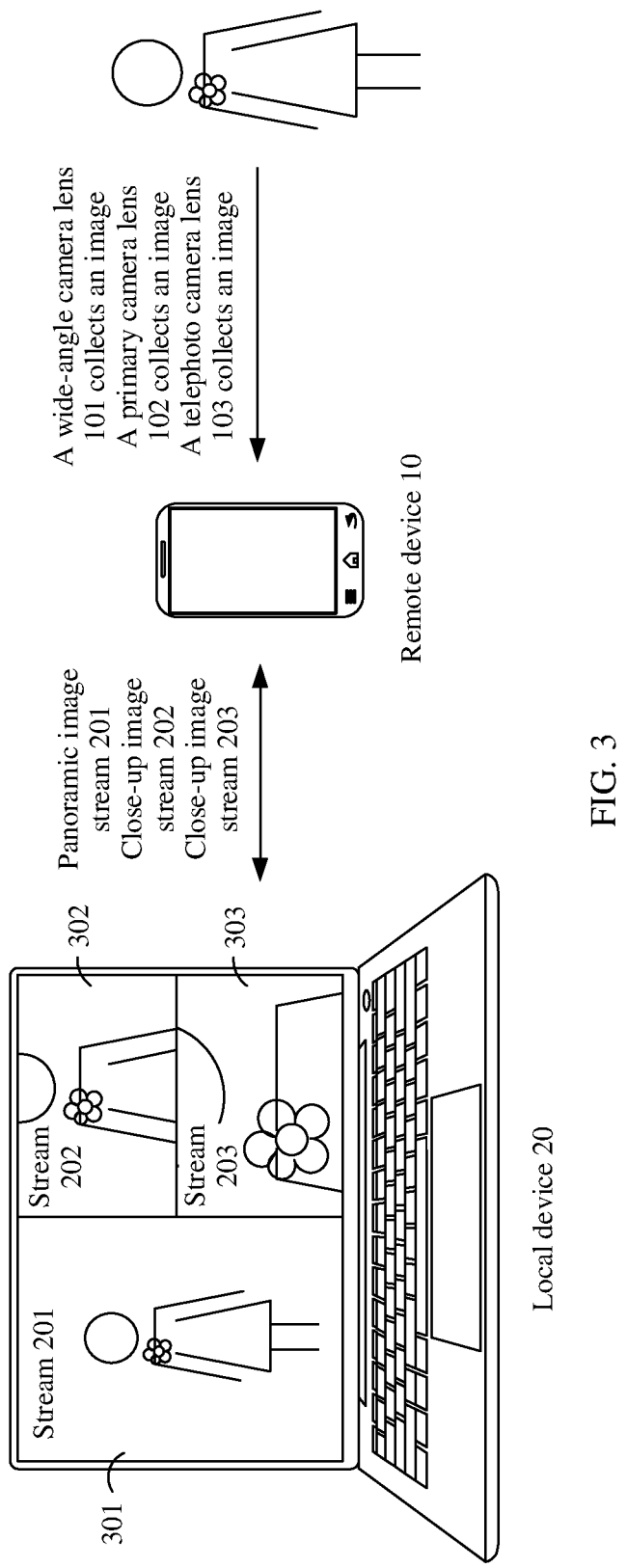
FIG. 3 is a diagram of an application scenario according to an embodiment of this application.

With reference to the system architecture shown in FIG. 2, FIG. 3 is a diagram of an application scenario according to an embodiment of this application. In FIG. 3, an example in which the local device 20 is a laptop computer and the remote device 10 is a mobile phone is used. When no camera lens is installed on the local device 20 or a limited quantity of camera lenses are installed, the local device 20 may control, by using a network, the remote device 10 to enable the wide-angle camera lens 101, the primary camera lens 102, and the telephoto camera lens 103, so that each camera lens starts to collect an image. The remote device 10 may send, to the local device 20, an image stream collected by each camera lens. In FIG. 3, an image stream collected by the wide-angle camera lens 101 is shown as a panoramic image stream 201, an image stream collected by the primary camera lens 102 is shown as a close-up image stream 202, and an image stream collected by the telephoto camera lens 103 is shown as a close-up image stream 203, so that the local device 20 may display a plurality of image streams. For example, the local device 20 may display the panoramic image stream 201 in an area 301 of a screen, display the close-up image stream 202 in an area 302, and display the close-up image stream 203 in an area 303. In this way, the local device 20 obtains a plurality of image streams by using a plurality of camera lenses of the remote device 10.

Figure 4:
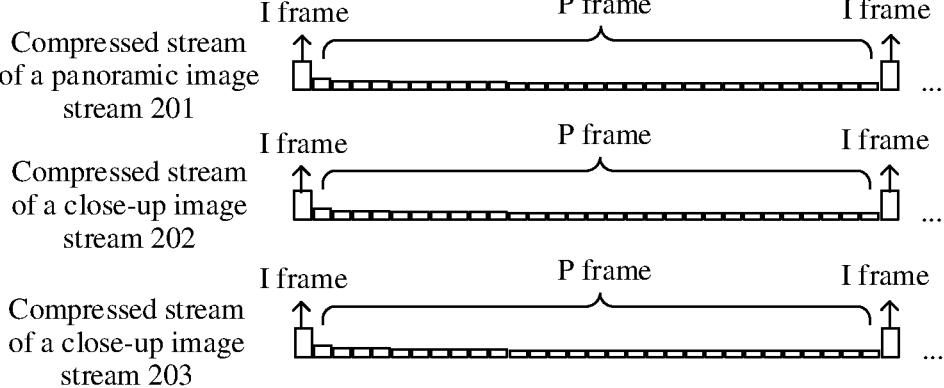
FIG. 4 is a schematic diagram 1 of compressed streams according to an embodiment of this application.

In FIG. 3, each image stream sent by the remote device 10 to the local device 20 has a large amount of data, but network bandwidth is limited. Therefore, the remote device 10 needs to compress each image stream. Refer to FIG. 4. Because the wide-angle camera lens 101, the primary camera lens 102, and the telephoto camera lens 103 collect images synchronously, after the remote device 10 compresses each image stream, I frames of compressed streams usually occur at the same time, and an amount of data of the I frames is large, resulting in an instantaneous increase of an amount of data transmitted in a network, and causing a display picture jitter of the local device. This affects user experience.

In some embodiments, a picture jitter problem may be resolved in the following manner.

Figure 5:
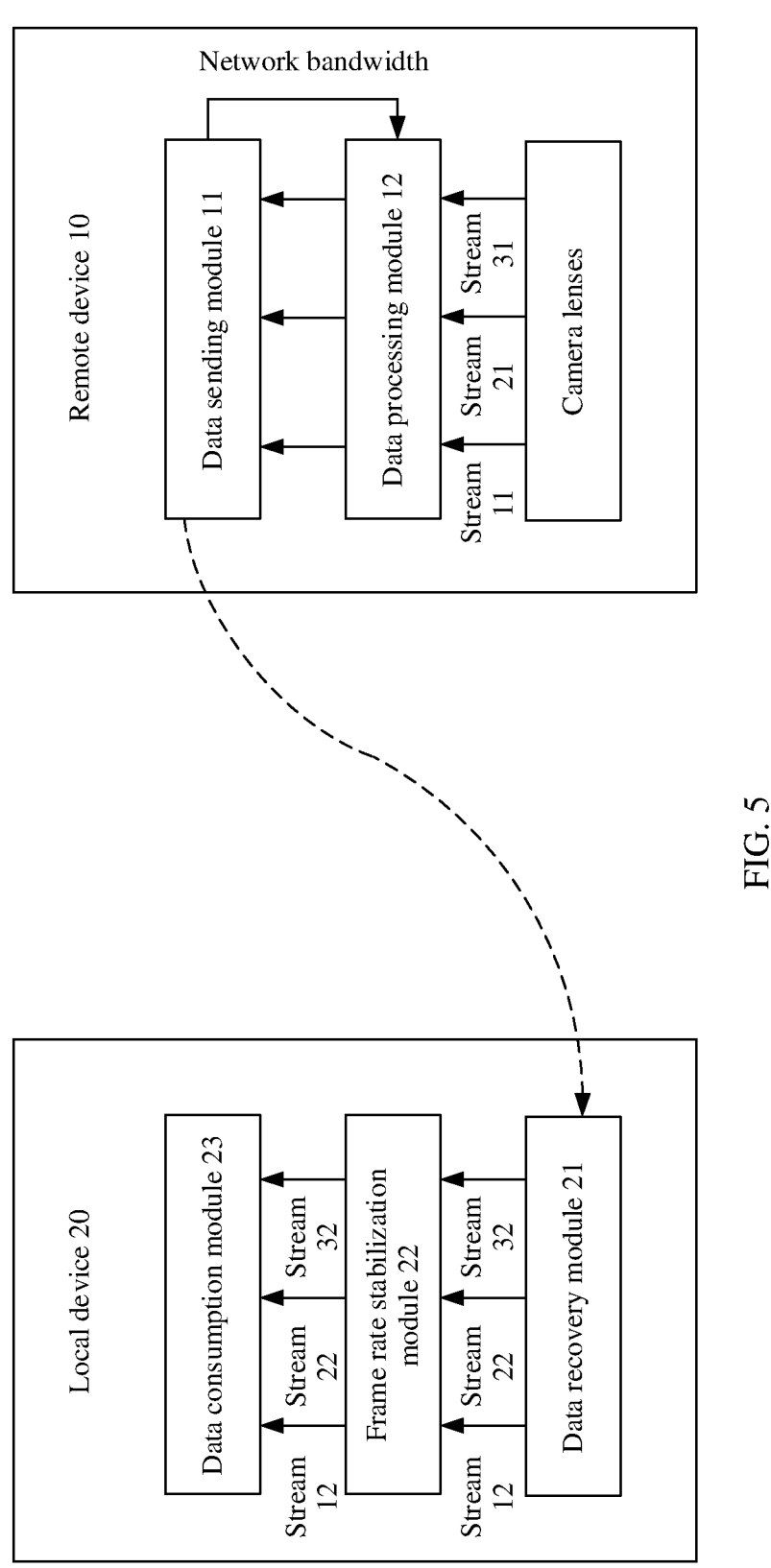
FIG. 5 is a diagram 1 of a software framework according to an embodiment of this application.

Refer to FIG. 5. A data sending module 11 and a data processing module 12 are disposed in the remote device 10. The data sending module 11 may exchange data with the data processing module 12, and the data processing module 12 is further connected to each camera lens of the remote device 10. The data sending module 11 is configured to monitor current network bandwidth, and send the current network bandwidth to the data processing module 12. After collecting an image stream, each camera lens on the remote device 10 sends the image stream to the data processing module 12. In FIG. 2, a stream 11, a stream 21, and a stream 31 are used to represent each image stream. When determining that the current network bandwidth is less than a preset value, the data processing module 12 reduces a bit rate of each compressed image stream, and then sends the compressed stream of each image stream to the sending module 11. The sending module 11 sends the compressed stream to the local device 20.

A data recovery module 21, a frame rate stabilization module 22, and a data consumption module 23 are disposed in the local device 20. The data recovery module 21, the frame rate stabilization module 22, and the data consumption module 23 are sequentially connected. After receiving the compressed stream of each image stream, the data recovery module 21 decodes the compressed stream of each image stream to obtain a stream 12, a stream 22, and a stream 32 in FIG. 2. The data recovery module 21 transmits each decoded image stream to the frame rate stabilization module 22. The frame rate stabilization module 22 is configured to ensure that a quantity of frames of each image stream sent to the data consumption module 23 in a same time period is the same. The data consumption module 23 may be a display module. The display module is configured to display each image stream sent by the frame rate stabilization module 22.

In the foregoing embodiment, the data processing module 12 reduces the bit rate of each image stream. Consequently, after the data recovery module 21 decodes the compressed stream of each image stream, picture quality of the obtained stream 11, stream 21, and stream 31 reduces. This affects user experience.

Figure 6:
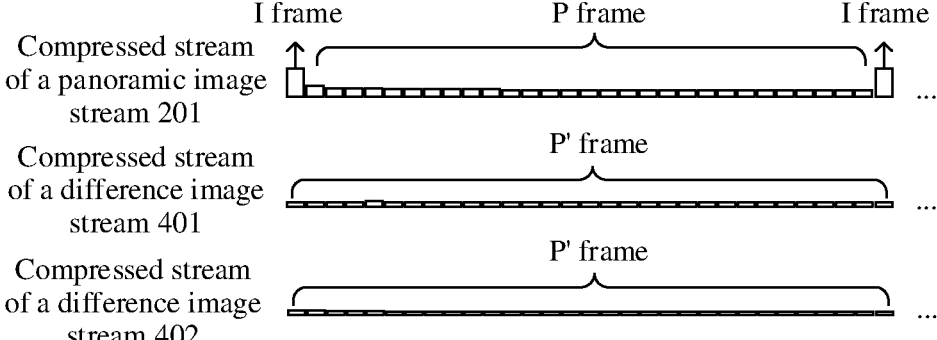
FIG. 6 is a schematic diagram 2 of compressed streams according to an embodiment of this application.

An embodiment of this application provides an encoding method. With reference to the scenario shown in FIG. 3, when the remote device 10 encodes the panoramic image stream 201, the close-up image stream 202, and the close-up image stream 203, for the panoramic image stream 201, the panoramic image stream 201 is encoded in a conventional manner to obtain a compressed stream of the panoramic image stream 201, as shown in FIG. 6. For the close-up image stream 202 and the close-up image stream 203, the close-up image stream 202 and the close-up image stream 203 are not directly encoded. Instead, a difference image between a close-up image and an enlarged image of a local area on a panoramic image is calculated by using a correlation between the close-up image and the panoramic image, and a difference image stream is encoded to obtain a compressed stream of the difference image stream. In FIG. 6, a difference image stream 401 is used to denote a difference image stream corresponding to the close-up image stream 202, and a difference image stream 402 is used to denote a difference image stream corresponding to the close-up image stream 203. Because a picture of the close-up image is a close-up of a local area on the panoramic image, that is, content of the picture of the close-up image is the same as content of the local area, and only details are different, an amount of data of the difference image is very small, and a P' frame obtained by encoding the difference image is smaller than a P frame obtained through conventional encoding. Therefore, a picture jitter caused by concurrent I frames does not occur. In addition, the bit rate of each image stream is not reduced in this embodiment of this application, and picture quality is improved in comparison with that in the embodiment shown in FIG. 5.

Based on the system architecture shown in FIG. 2, the following describes in detail an interaction process between the remote device 10 and the local device 20.

Figure 7:
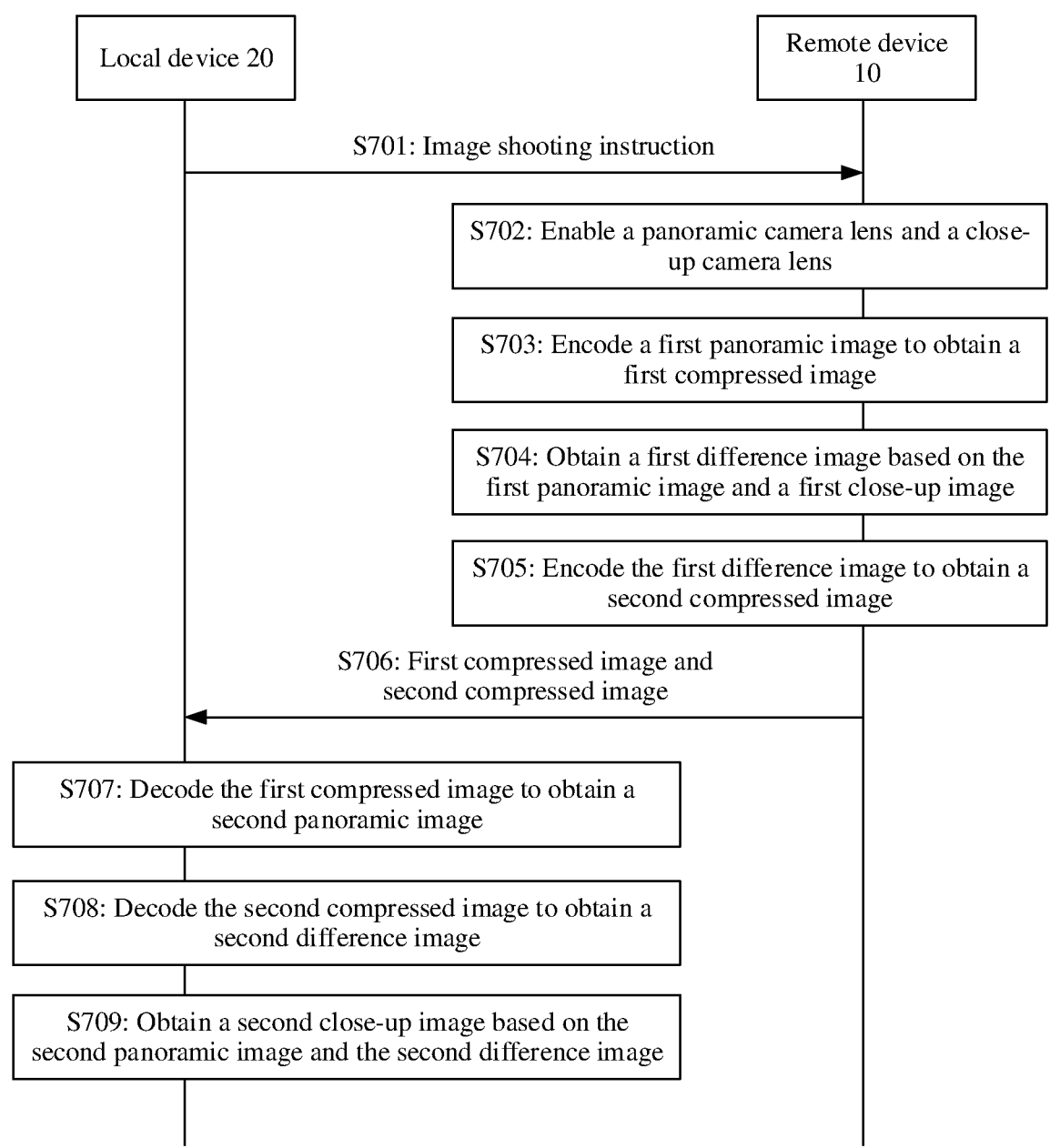
FIG. 7 is a diagram of interaction between a remote device 10 and a local device 20 according to an embodiment of this application.

FIG. 7 is a diagram of interaction between the remote device 10 and the local device 20 according to an embodiment of this application.

Specifically, when the remote device 10 is a separate terminal device, the terminal device interacts with the local device 20. When the remote device 10 includes a terminal device and at least one single-lens reflex camera, the terminal device interacts with the local device 20. When the remote device 10 includes a plurality of single-lens reflex cameras, a single-lens reflex camera in the plurality of single-lens reflex cameras that is configured to interact with the local device 20 interacts with the local device 20. The diagram of interaction shown in FIG. 3 includes the following steps.

S701: The local device 20 sends an image shooting instruction to the remote device 10.

S702: After receiving the image shooting instruction, the remote device 10 enables a panoramic camera lens and a close-up camera lens.

In a possible implementation, a camera application is installed on the local device 20, and a corresponding remote camera agent is installed on the remote device 10. When a user needs to obtain a plurality of image streams by using a plurality of camera lenses of the remote device 10, the user may trigger the image shooting instruction on the camera application. The camera application sends the image shooting instruction to the remote camera agent. After receiving the image shooting instruction, the remote camera agent enables the panoramic camera lens and the close-up camera lens. The panoramic camera lens and the close-up camera lens start to synchronously collect images.

In another possible implementation, a same video call application is installed on each of the local device 20 and the remote device 10. After a video call between the local device 20 and the remote device 10 is connected, the user may trigger the image shooting instruction on the video call application installed on the local device 20. The video call application installed on the local device 20 sends the image shooting instruction to the video call application installed on the remote device 10. After receiving the image shooting instruction, the video call application installed on the remote device 10 enables the panoramic camera lens and the close-up camera lens. The panoramic camera lens and the close-up camera lens start to synchronously collect images.

For ease of differentiation, an image stream collected by the panoramic camera lens is referred to as a first panoramic image stream below, and an image stream collected by the close-up camera lens is referred to as a first close-up image stream below.

With reference to the scenario shown in FIG. 3, after receiving the image shooting instruction, the remote device 10 enables the wide-angle camera lens 101, the primary camera lens 102, and the telephoto camera lens 103.

S703: The remote device 10 encodes a first panoramic image to obtain a first compressed image.

The first panoramic image is any image in the first panoramic image stream. If the first panoramic image needs to be encoded into I frames, the first panoramic image may be encoded by using a spatial compression (spatial compression) algorithm. If the first panoramic image needs to be encoded into P frames, the first panoramic image may be encoded by using a temporal compression (temporal compression) algorithm.

In the scenario shown in FIG. 3, the first panoramic image stream is the panoramic image stream 201.

S704: The remote device 10 obtains a first difference image based on the first panoramic image and a first close-up image.

Figure 8:
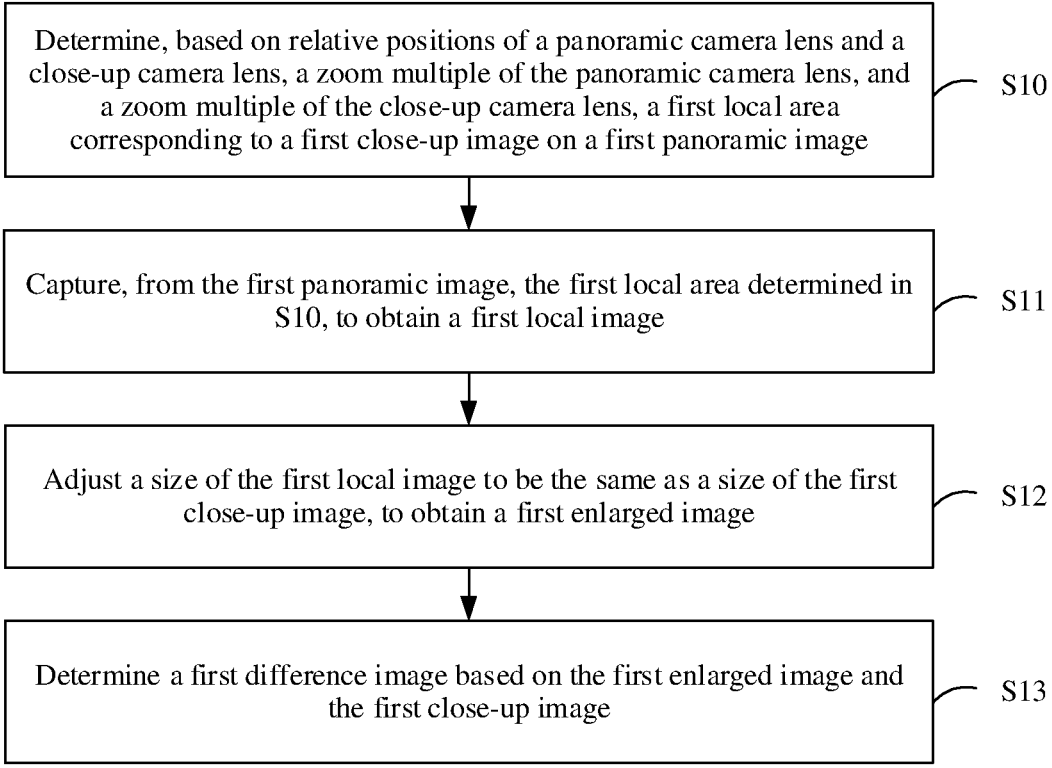
FIG. 8 is a flowchart of obtaining a first difference image according to an embodiment of this application.

The first difference image may be obtained by performing the method shown in FIG. 8. For ease of description, an image that is in the first close-up image stream and that is collected synchronously with the first panoramic image is referred to as the first close-up image, and a picture of the first close-up image is a close-up of a local area on the first panoramic image.

The method shown in FIG. 8 specifically includes the following steps.

S10: Determine, based on relative positions of the panoramic camera lens and the close-up camera lens, a zoom multiple of the panoramic camera lens, and a zoom multiple of the close-up camera lens, a first local area corresponding to the first close-up image on the first panoramic image.

Figure 9:
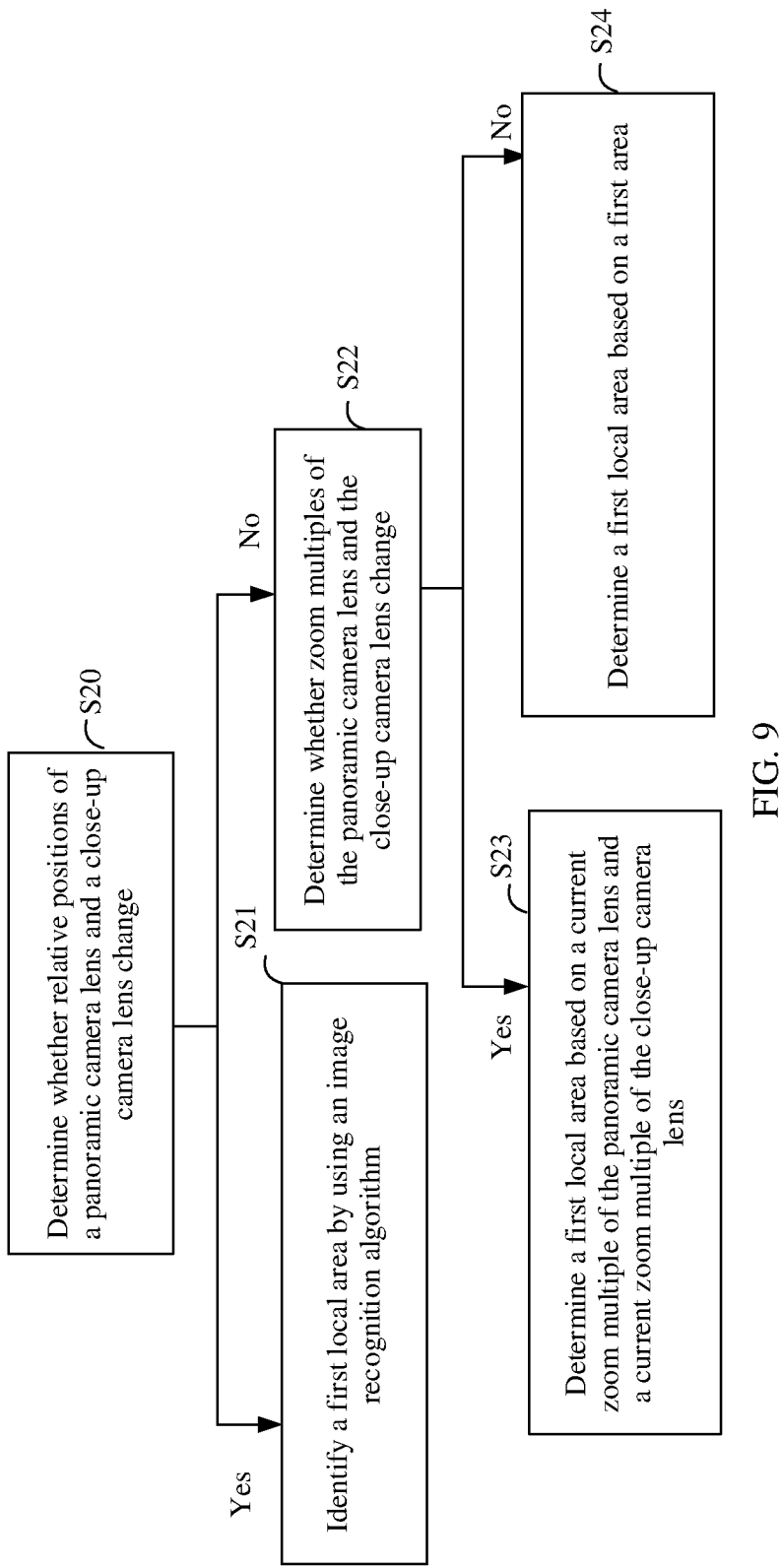
FIG. 9 is a flowchart of determining a first local area according to an embodiment of this application.

Refer to FIG. 9. The first local area may be determined in the following manner.

S20: Determine whether the relative positions of the panoramic camera lens and the close-up camera lens change.

Specifically, first relative positions are obtained. The first relative positions are relative positions that the panoramic camera lens collects a previous-frame image of the first panoramic image and the close-up camera lens collects a previous-frame image of the first close-up image. The first relative positions are compared with current relative positions, and whether the relative positions of the panoramic camera lens and the close-up camera lens change is determined based on a comparison result.

If the relative positions of the panoramic camera lens and the close-up camera lens change, S21 is performed. If the relative positions of the panoramic camera lens and the close-up camera lens do not change, S22 is performed.

S21: Determine the first local area by using an image recognition algorithm.

S22: Determine whether the zoom multiples of the panoramic camera lens and the close-up camera lens change.

Specifically, a zoom multiple of the panoramic camera lens collecting the previous-frame image of the first panoramic image is obtained. A current zoom multiple of the panoramic camera lens is compared with the zoom multiple. Whether the zoom multiple of the panoramic camera lens changes is determined based on a comparison result. A zoom multiple of the close-up camera lens collecting the previous-frame image of the first close-up image is obtained. A current zoom multiple of the close-up camera lens is compared with the zoom multiple. Whether the zoom multiple of the close-up camera lens changes is determined based on a comparison result.

If the zoom multiple of any one of the panoramic camera lens and the close-up camera lens changes, S23 is performed. If neither the zoom multiple of the panoramic camera lens nor the zoom multiple of the close-up camera lens changes, S24 is performed.

S23: Determine the first local area based on the current zoom multiple of the panoramic camera lens and the current zoom multiple of the close-up camera lens.

In a scenario in which the remote device 10 is a separate terminal device, the first panoramic image and the first close-up image are images whose central points are aligned, and the first local area may be determined based on the current zoom multiple of the panoramic camera lens, the current zoom multiple of the close-up camera lens, a size of the first close-up image, and a central point of the first panoramic image.

The following is an example.

Figure 10A:
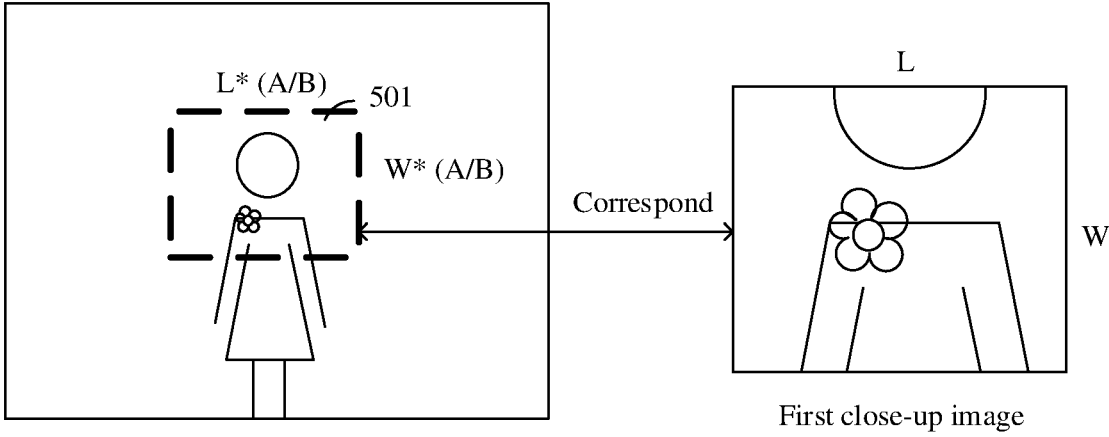
FIG. 10A is a conceptual diagram 1 of determining a first local area according to an embodiment of this application.

Refer to FIG. 10A. Assuming that the current zoom multiple of the panoramic camera lens is A, the current zoom multiple of the close-up camera lens is B, a length of the first close-up image is L, and a width of the first close-up image is W, a first local area 501 is an area whose central point is the central point of the first panoramic image, whose length is L*(A/B), and whose width is W*(A/B).

For a scenario in which the remote device 10 includes a terminal device and at least one single-lens reflex camera, or for a scenario in which the remote device 10 includes a plurality of single-lens reflex cameras, the first local area may be determined based on the current zoom multiple of the panoramic camera lens, the current zoom multiple of the close-up camera lens, and a first area. The first area is a local area corresponding to the previous-frame image of the first close-up image on the previous-frame image of the first panoramic image.

The following is an example.

Figure 10B:
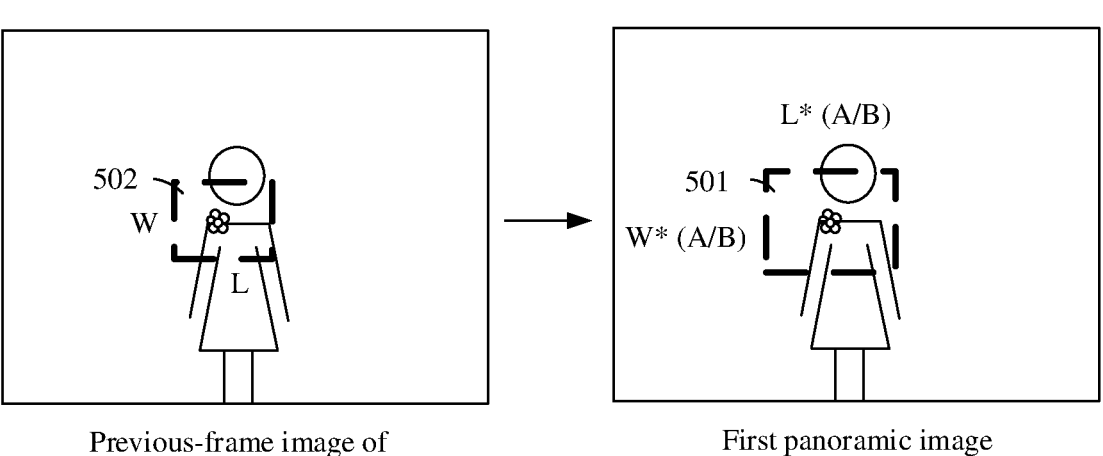
FIG. 10B is a conceptual diagram 2 of determining a first local area according to an embodiment of this application.

Refer to FIG. 10B. Assuming that a first area 502 is an area whose length is L and whose width is W in FIG. 10B, the current zoom multiple of the panoramic camera lens is A, and the current zoom multiple of the close-up camera lens is B, the first local area 501 is a corresponding area whose length is A/B times of the length of the first area 502 and whose width is A/B times of the width of the first area 502.

S24: Determine the first local area based on the first area, where the first area is the local area corresponding to the previous-frame image of the first close-up image on the previous-frame image of the first panoramic image.

For example, refer to FIG. 10B. It is assumed that the first area 502 is the area whose length is L and whose width is W on the previous-frame image of the first panoramic image. An area corresponding to a position of the first area 502 is found on the first panoramic image, and the area is used as the first local area.

After the first local area is obtained, the following steps are performed.

S11: Capture, from the first panoramic image, the first local area determined in S10, to obtain a first local image.

S12: Adjust a size of the first local image to be the same as the size of the first close-up image, to obtain a first enlarged image.

The following is an example.

Figure 11:
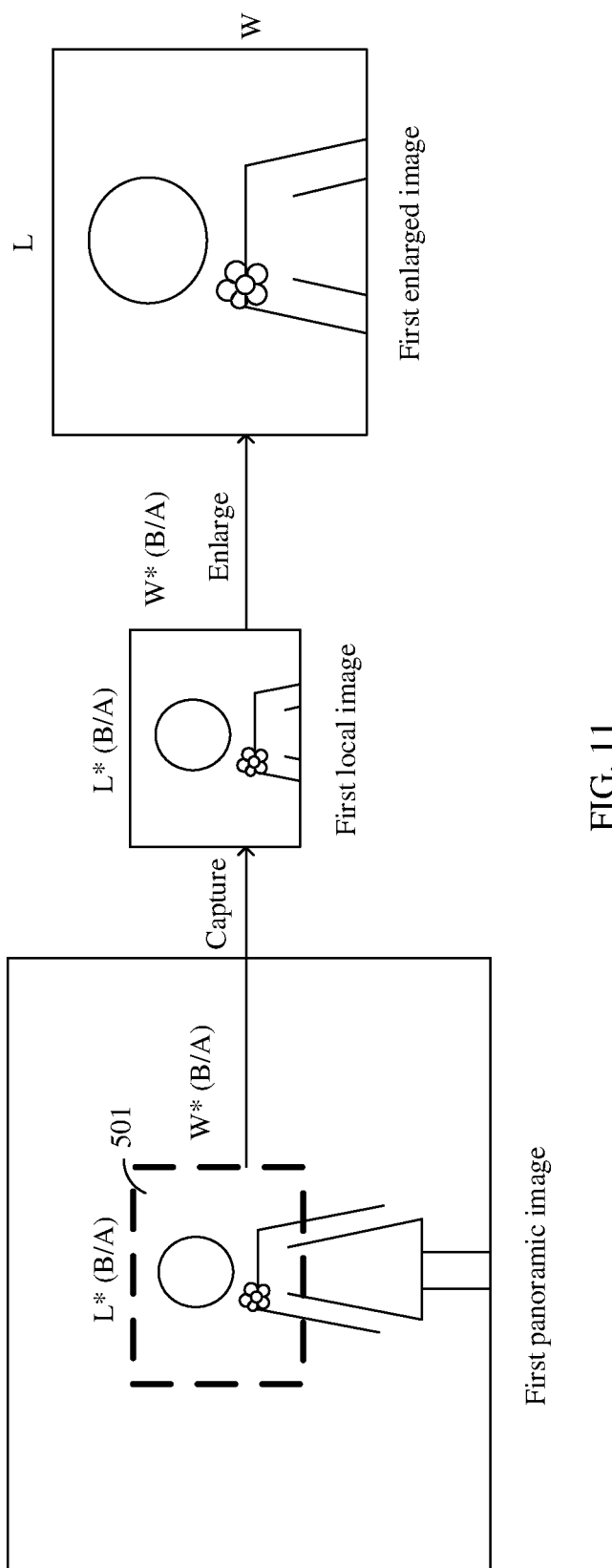
FIG. 11 is a conceptual diagram of obtaining a first enlarged image according to an embodiment of this application.

Refer to FIG. 11. It may be determined, based on S10, that the first local area 501 is the area whose central point is the central point of the first panoramic image, whose length is L*(A/B), and whose width is W*(A/B). The area 501 may be captured from the first panoramic image to obtain the first local image. A length of the first local image is L*(B/A), and a width of the first local image is W*(B/A). The length of the first local image is enlarged to L, and the width of the first local image is enlarged to W, to obtain the first enlarged image.

S13: Determine the first difference image based on the first enlarged image and the first close-up image.

In a possible implementation, a difference between color values of pixels may be determined based on color values of pixels on the first close-up image and color values of pixels on the first enlarged image. The first difference image is obtained based on the difference between color values of pixels.

For example, a YUV value of each pixel on the first enlarged image is extracted, and a YUV value of each pixel on the first close-up image is extracted. Then, the YUV value of a corresponding pixel on the first close-up image is subtracted from the YUV value of each pixel on the first enlarged image, to obtain a YUV value of each pixel, and the first difference image is obtained through rendering based on the YUV value of each pixel.

The following is an example.

Figure 12:
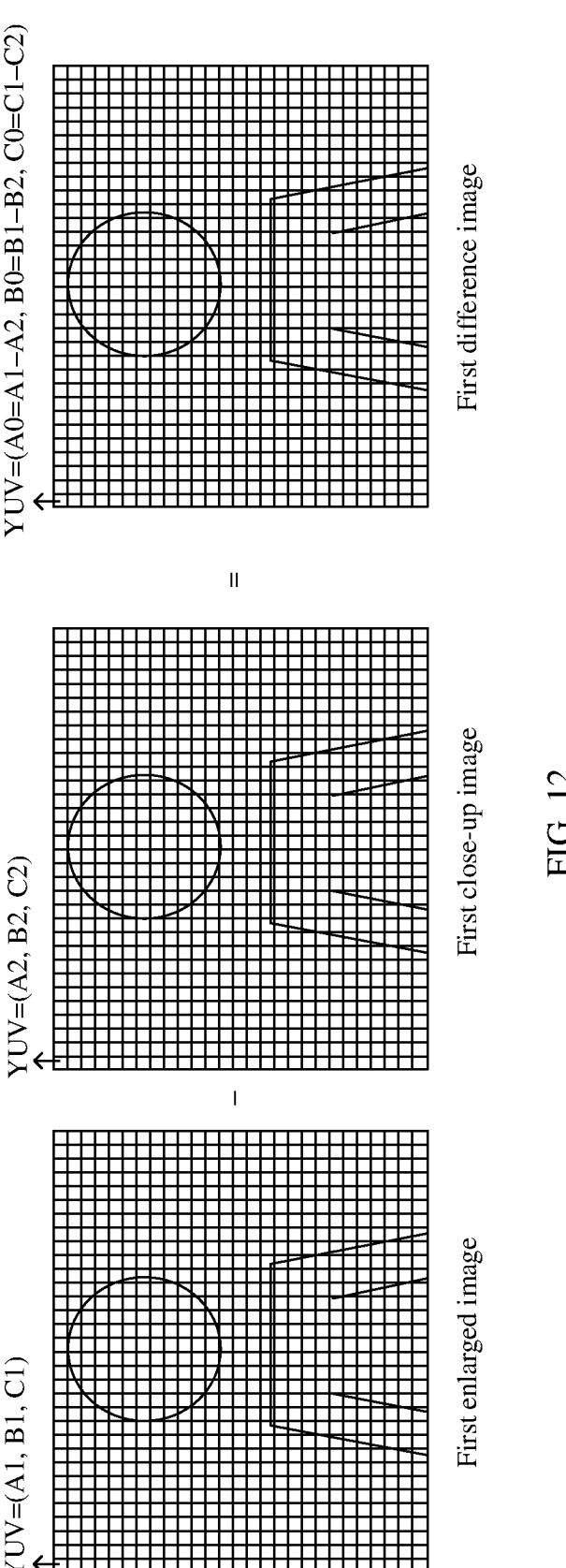
FIG. 12 is a conceptual diagram of obtaining a first difference image according to an embodiment of this application.

Refer to FIG. 12. After the first enlarged image is obtained based on S3034, the YUV value of each pixel on the first enlarged image is extracted. It is assumed that an extracted YUV value of a pixel in a first row and a first column is (A1, B1, C1). In addition, the YUV value of each pixel on the first close-up image is extracted. It is assumed that an extracted YUV value of a pixel in a first row and a first column is (A2, B2, C2). The YUV value of a corresponding pixel on the first close-up image is subtracted from the YUV value of each pixel on the first enlarged image, to obtain a YUV value of each pixel. For example, a YUV value of a pixel in a first row and a first column is (A0=A1−A2, B0=B1−B2, C0=C1−C2). After the YUV value of each pixel is obtained, the first difference image is obtained through rendering based on the YUV value of each pixel.

It should be noted that the YUV value of a corresponding pixel on the first enlarged image may also be subtracted from the YUV value of each pixel on the first close-up image corresponding to the first panoramic image. The foregoing example is merely an example, and does not constitute a limitation on this application.

In the scenario shown in FIG. 3, the first close-up image stream includes the close-up image stream 202 and the close-up image stream 203. The difference image stream 401 corresponding to the close-up image stream 202 may be obtained based on the panoramic image stream 201 and the close-up image stream 202. The difference image stream 402 corresponding to the close-up image stream 203 may be obtained based on the panoramic image stream 201 and the close-up image stream 203. For a specific process, refer to S10 to S13. Details are not described again in this embodiment of this application.

S705: Encode the first difference image to obtain a second compressed image.

In a possible implementation, the first difference image may be encoded by using a spatial compression (spatial compression) algorithm.

S706: The remote device 10 sends the first compressed image and the second compressed image to the local device 20.

S707: The local device 20 decodes the first compressed image to obtain a second panoramic image.

In a possible implementation, if the first compressed image is an I frame, a complete image is reconstructed based on data of the I frame. If the first compressed image is a P frame, a complete image is reconstructed based on an image obtained after a previous P frame is decoded and data of a current P frame.

S708: The local device 20 decodes the second compressed image to obtain a second difference image.

In a possible implementation, for an image frame obtained through encoding by using the spatial compression (spatial compression) algorithm, a complete image is reconstructed based on data of the image frame.

S709: The local device 20 obtains a second close-up image based on the second panoramic image and the second difference image.

For each frame image in a second difference image stream, a corresponding second close-up image may be obtained by performing the method shown in FIG. 13. For ease of description, the image in the second difference image stream is referred to as the second difference image. A panoramic image corresponding to the image in a second panoramic image stream is referred to as the second panoramic image.

The method shown in FIG. 13 specifically includes the following steps.

S30: Determine a second local area corresponding to the second close-up image on the second panoramic image.

If a detection result of S20 is that the relative positions of the panoramic camera lens and the close-up camera lens change, when sending the first compressed image and the second compressed image to the local device 20 in S706, the remote device 10 may further send, to the local device 20, first local area information determined in S21. The local device 20 determines the second local area based on the first local area information.

If the detection result of S20 is that the relative positions of the panoramic camera lens and the close-up camera lens do not change, and a detection result of S22 is that the zoom multiples of the panoramic camera lens and the close-up camera lens change, when sending the first compressed image and the second compressed image to the local device 20 in S706, the remote device 10 may further send first local area information or camera lens information determined in S23 to the local device 20. The camera lens information includes the current zoom multiple of the panoramic camera lens and the current zoom multiple of the close-up camera lens. If the remote device 10 sends the first local area information determined in S23 to the local device 20, the local device 20 determines the second local area based on the first local area information.

For example, assuming that the remote device 10 sends first local area 501 information in FIG. 10A to the local device 20, the local device 20 may find, on the second panoramic image and based on the first local area 501 information, an area corresponding to a position of the first local area 501, and use the area as the second local area.

If the remote device 10 sends the camera lens information to the local device 20, the local device 20 determines the second local area in the following manners.

In a possible implementation, the second local area may be determined based on the current zoom multiple of the panoramic camera lens, the current zoom multiple of the close-up camera lens, a size of the second difference image, and a central point of the second panoramic image. A size of the second close-up image is equal to the size of the second difference image.

The following is an example.

Refer to FIG. 14A. Assuming that the current zoom multiple of the panoramic camera lens is A, the current zoom multiple of the close-up camera lens is B, a length of the second difference image is L, and a width of the second difference image is W, a second local area 503 is an area whose central point is the central point of the second panoramic image, whose length is L*(A/B), and whose width is W*(A/B).

In another possible implementation, the second local area may be determined based on the current zoom multiple of the panoramic camera lens, the current zoom multiple of the close-up camera lens, and a second area. The second area is a local area corresponding to a previous-frame image of the second close-up image on a previous-frame image of the second panoramic image.

The following is an example.

Figure 14B:
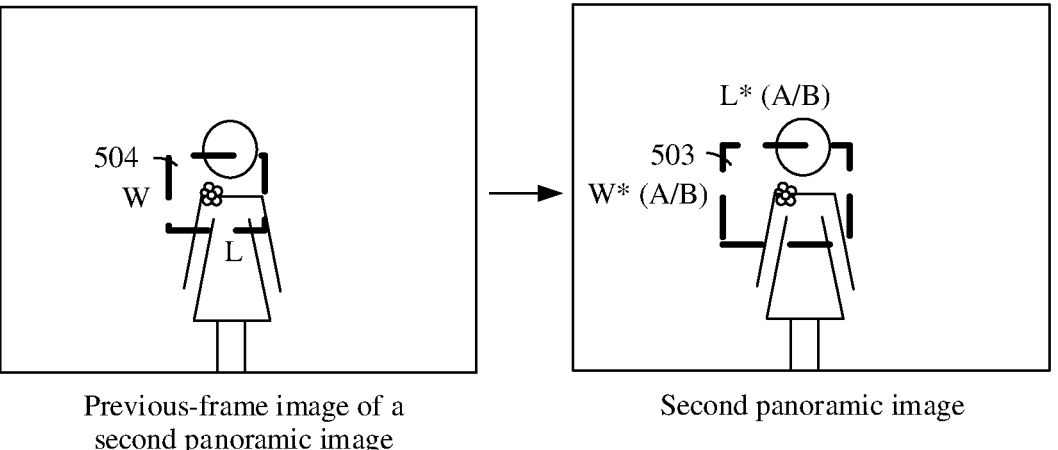
FIG. 14B is a conceptual diagram 2 of determining a second local area according to an embodiment of this application.

Refer to FIG. 14B. Assuming that a second area 504 is an area whose length is L and whose width is W in FIG. 14B, the current zoom multiple of the panoramic camera lens is A, and the current zoom multiple of the close-up camera lens is B, the second local area 503 is a corresponding area whose length is A/B times of the length of the second area 504, and whose width is A/B times of the width of the second area.

After the second local area is obtained, the following steps are performed.

S31: Capture the second local area from the second panoramic image, to obtain a second local image.

S32: Adjust a size of the second local image to be the same as the size of the second difference image, to obtain a second enlarged image.

The following is an example.

Figure 15:
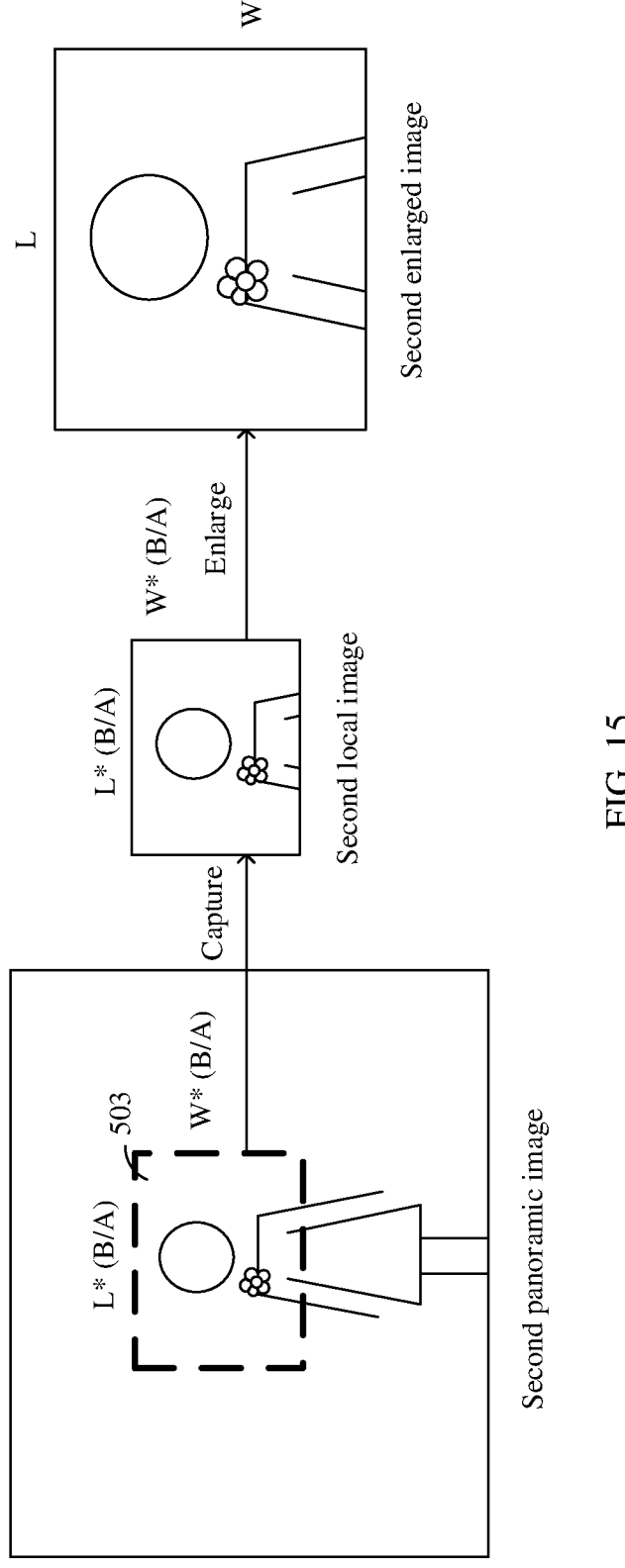
FIG. 15 is a conceptual diagram of obtaining a second enlarged image according to an embodiment of this application.

Refer to FIG. 15. It may be determined, based on S30, that the second local area 503 is the area whose central point is the central point of the second panoramic image, whose length is L*(A/B), and whose width is W*(A/B). The area may be captured from the second panoramic image, to obtain the second local image. A length of the second local image is L*(B/A), and a width of the second local image is W*(B/A). The length of the second local image is enlarged to L, and the width of the second local image is enlarged to W, to obtain the second enlarged image.

S33: Determine the second close-up image based on the second enlarged image and the second difference image.

In a possible implementation, a difference/sum of color values of pixels may be determined based on color values of pixels on the difference image and color values of pixels on the second enlarged image. The second close-up image is obtained based on the difference/sum of color values of pixels.

For example, a YUV value of each pixel on the second enlarged image is extracted, and a YUV value of each pixel on the second difference image is extracted. Then, the YUV value of a corresponding pixel on the second difference image is subtracted from the YUV value of each pixel on the second enlarged image, to obtain a YUV value of each pixel, and the second close-up image is obtained through rendering based on the YUV value of each pixel.

The following is an example.

Figure 16:
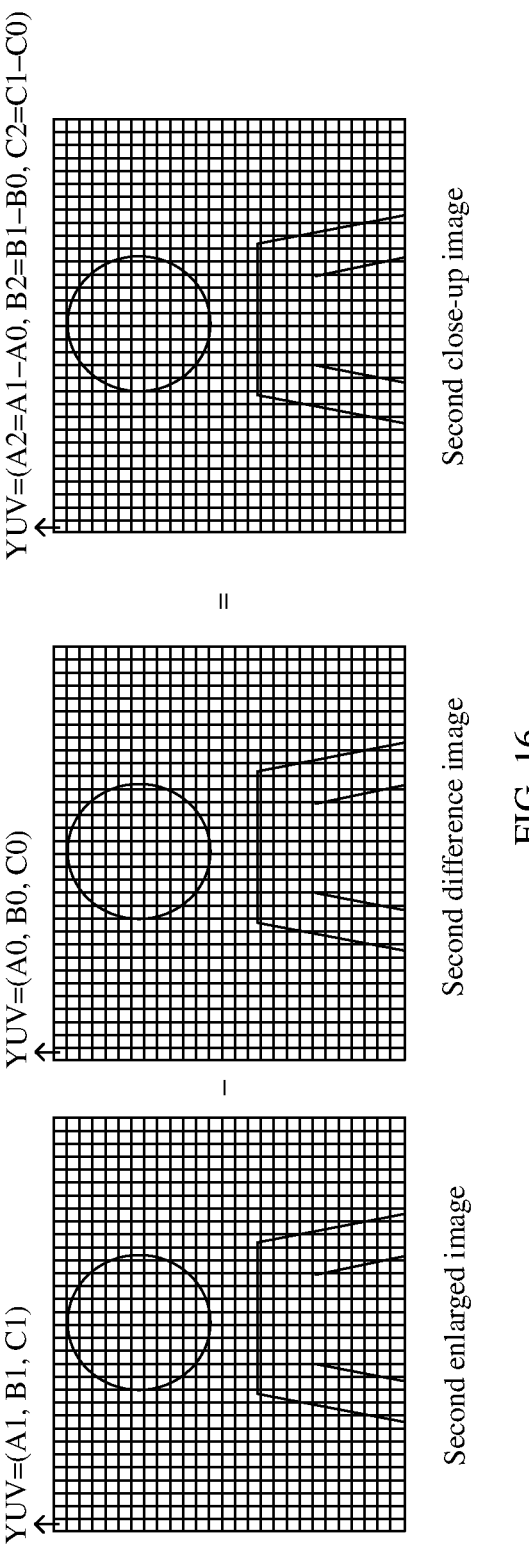
FIG. 16 is a conceptual diagram of obtaining a second close-up image according to an embodiment of this application.

Refer to FIG. 16. After the second enlarged image is obtained based on S32, the YUV value of each pixel on the second enlarged image is extracted. It is assumed that an extracted YUV value of a pixel in a first row and a first column is (A1, B1, C1). In addition, the YUV value of each pixel on the second difference image is extracted. It is assumed that an extracted YUV value of a pixel in a first row and a first column is (A0, B0, C0). The YUV value of a corresponding pixel on the second difference image is subtracted from the YUV value of each pixel on the first enlarged image, to obtain a YUV value of each pixel. For example, a YUV value of a pixel in a first row and a first column is (A2=A1−A0, B2=B1−B0, C2=C1−C0). After the YUV value of each pixel is obtained, the second close-up image is obtained through rendering based on the YUV value of each pixel.

In the scenario shown in FIG. 3, after receiving the compressed stream of the panoramic image stream 201, a compressed stream of the difference image stream 401, and a compressed stream of the difference image stream 402, the local device 20 decodes the compressed stream of the panoramic image stream 201, to obtain a decoded panoramic image stream. The decoded panoramic image stream is marked as a first image stream. The compressed stream of the difference image stream 401 is decoded to obtain a decoded difference image stream, and a second image stream may be obtained according to S30 to S33 based on the first image stream and the decoded difference image stream. The compressed stream of the difference image stream 402 is decoded to obtain a decoded difference image stream, and a third image stream may be obtained according to S30 to S33 based on the first image stream and the decoded difference image stream. The local device may display the foregoing three image streams on a display for a user to view, so that the local device 20 obtains a plurality of image streams by using a plurality of camera lenses of the remote device 10.

It should be noted that when the third image stream is obtained, the third image stream may also be obtained based on the second image stream and the decoded difference image stream. This is not limited in this embodiment of this application.

According to the encoding and decoding manner provided in this embodiment of this application, the picture of the close-up image is the close-up of the local area on the panoramic image, that is, content of the picture of the close-up image is consistent with content of the local area, and only image details are different. Therefore, an amount of data of the difference image is very small, and a picture jitter caused by concurrent I frames does not occur. In addition, a bit rate of each image stream is not reduced in this embodiment of this application, and picture quality is improved in comparison with that in the embodiment shown in FIG. 5.

Figure 17:
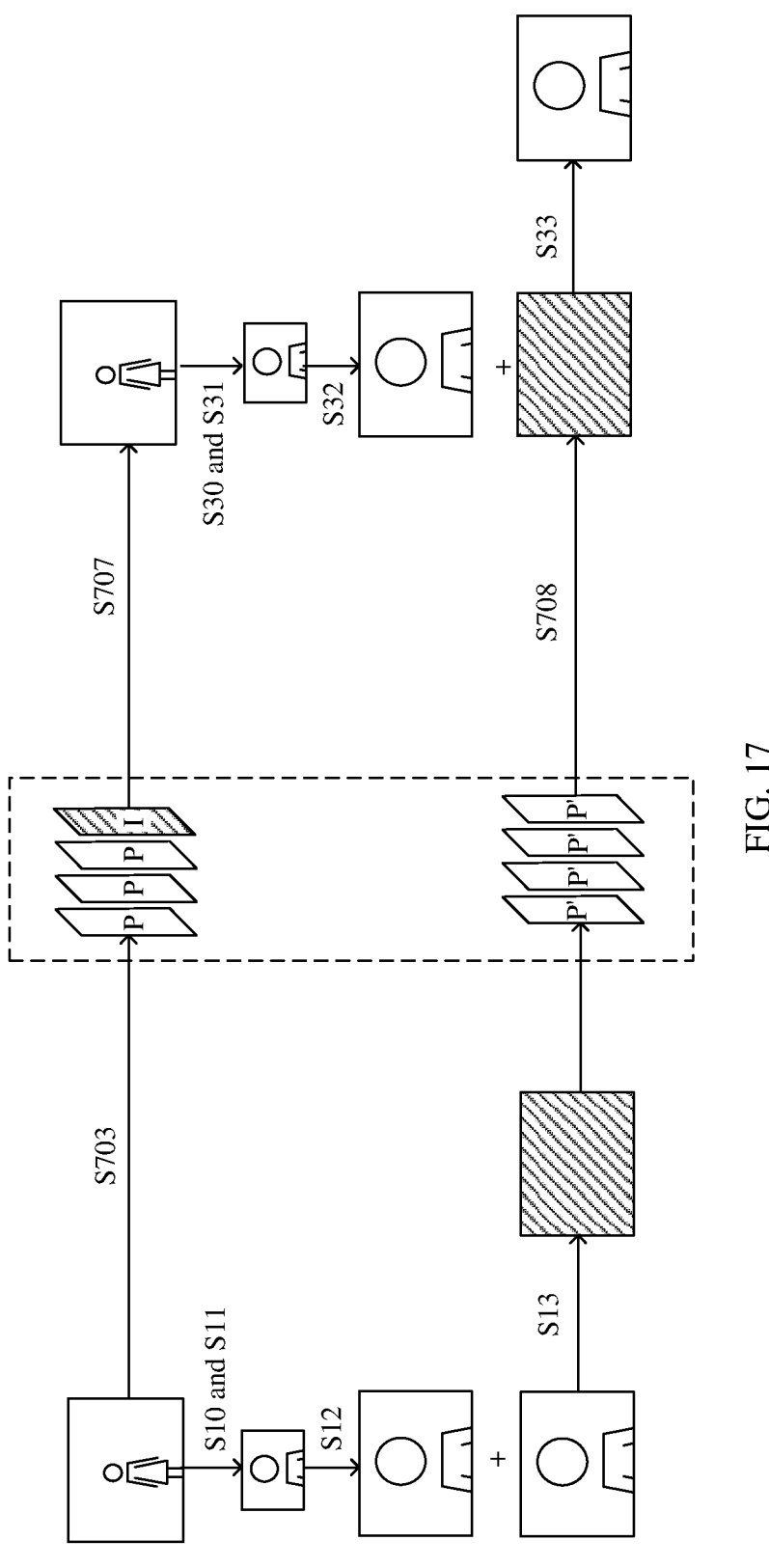
FIG. 17 is a conceptual diagram of an encoding and decoding method according to an embodiment of this application.

FIG. 17 is a schematic diagram of another embodiment according to this application. After collecting a first panoramic image and a first close-up image, the remote device 10 obtains a first compressed image by performing S703. A first local image is obtained by performing S10 and S11. Based on the first local image, a first enlarged image is obtained by performing S12. Based on the first enlarged image and the first close-up image, a first difference image is obtained by performing S13. After receiving the first compressed image and a second compressed image that are sent by the remote device 10, the local device 20 performs S707 to obtain a second panoramic image, and performs S708 to obtain a second difference image. A second local image is obtained by performing S30 and S31. Based on the second local image, a second enlarged image is obtained by performing S32. Based on the second enlarged image and the second difference image, a second close-up image is obtained by performing S33.

Figure 18A:
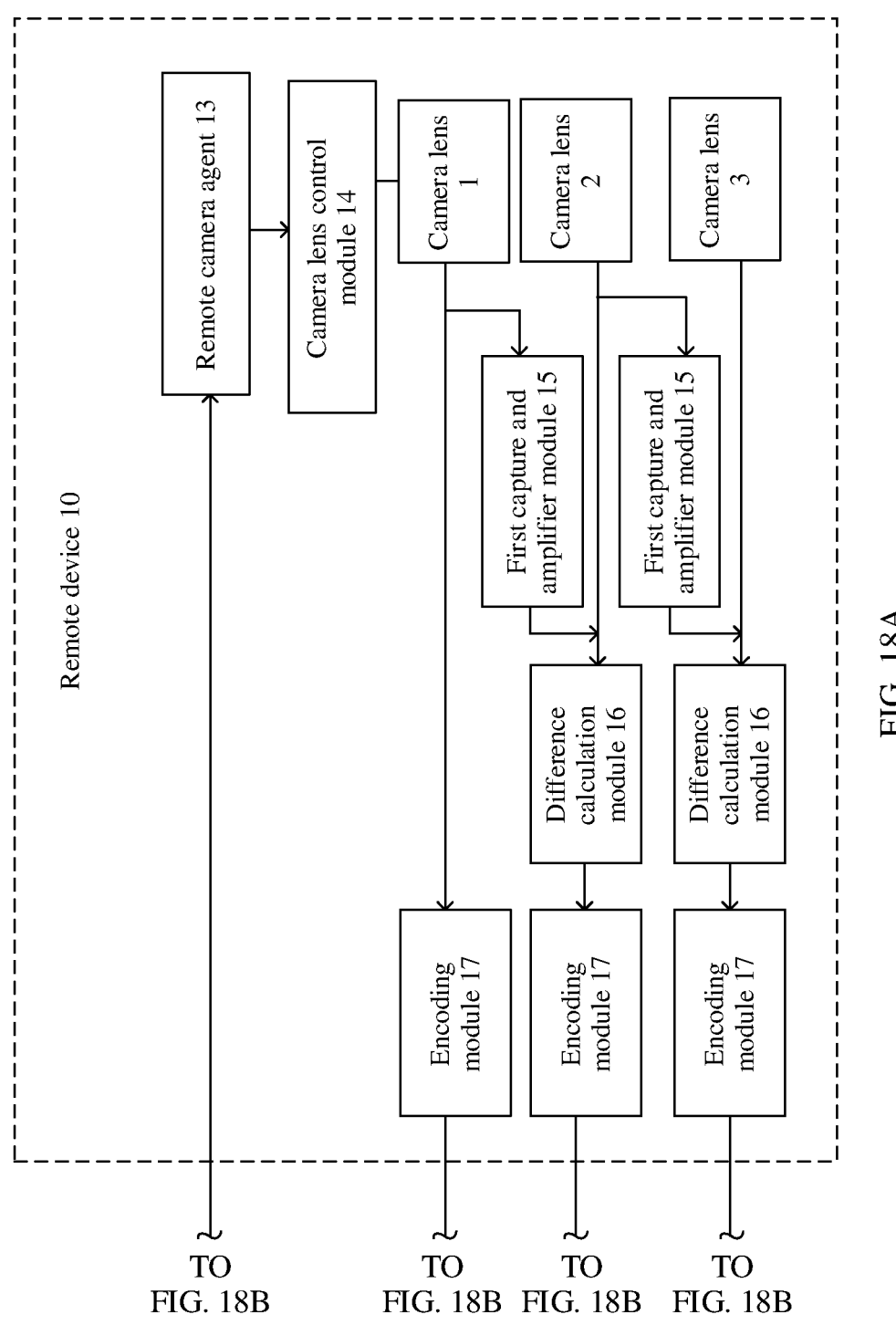
FIG. 18A and FIG. 18B are a diagram 2 of a software framework according to an embodiment of this application.
Figures 18A, 18B:
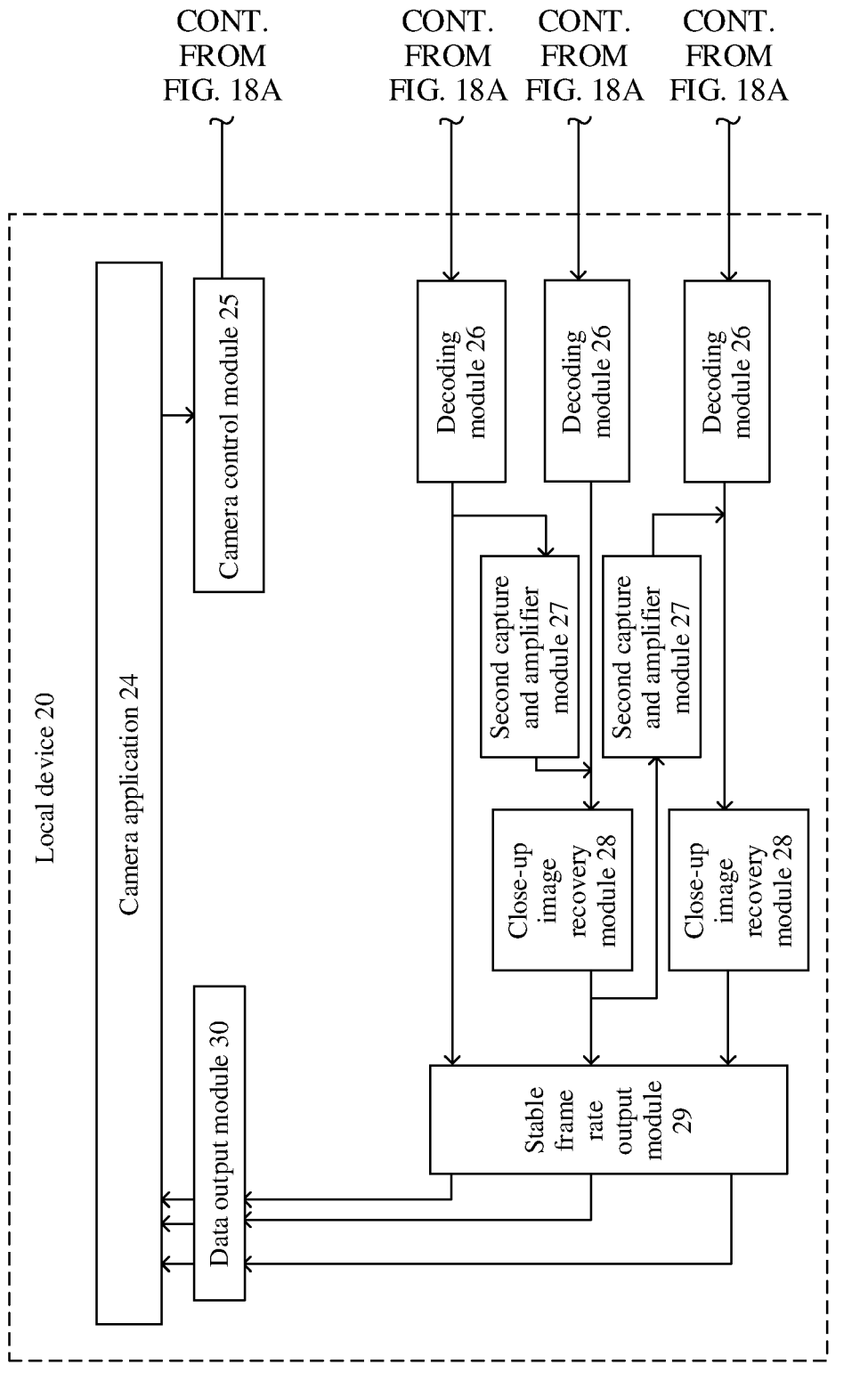

FIG. 18A and FIG. 18B are a diagram of a software framework according to this application. Refer to FIG. 18A and FIG. 18B. The remote device 10 includes but is not limited to a remote camera agent 13, a camera lens control module 14, camera lenses 1 to 3, a first capture and amplifier module 15, a difference calculation module 16, and an encoding module 17. The local device 20 includes but is not limited to a camera application 24, a camera control module 25, a decoding module 26, a second capture and amplifier module 27, a close-up image recovery module 28, a stable frame rate output module 29, and a data output module 30.

In a possible implementation, to obtain a plurality of image streams by using a plurality of camera lenses of the remote device 10, a user may trigger an image shooting instruction on the camera application 24. The camera application 24 sends the image shooting instruction to the camera control module 25, and the camera control module 25 sends the image shooting instruction to the remote device agent 13. The remote device agent 13 further sends the image shooting instruction to the camera lens control module 14, and the camera lens control module 14 enables the camera lenses 1 to 3. The camera lens 1 starts to collect a panoramic image, and the camera lens 2 and the camera lens 3 start to collect a close-up image. The camera lens 1 may be a wide-angle camera lens, and the camera lens 2 and the camera lens 3 may respectively be a primary camera lens and a telephoto camera lens.

The encoding module 17 in the remote device 10 is configured to encode a first panoramic image, to obtain a first compressed image. The first capture and amplifier module 15 is configured to determine, based on relative positions of a panoramic camera lens and a close-up camera lens, a zoom multiple of the panoramic camera lens, and a zoom multiple of the close-up camera lens, a first local area corresponding to a first close-up image on the first panoramic image. The first local area is captured from the first panoramic image, to obtain a first local image. A size of the first local image is adjusted to be the same as a size of the first close-up image, to obtain a first enlarged image. The difference calculation module 16 is configured to determine a first difference image based on the first enlarged image and the first close-up image. The encoding module 17 is further configured to: encode the first difference image to obtain a second compressed image, and send the first compressed image and the second compressed image to the local device 20.

The decoding module 26 in the local device 20 is configured to: decode the first compressed image to obtain a second panoramic image, and decode the second compressed image to obtain a second difference image. The second capture and amplifier module 27 is configured to:

determine a second local area corresponding to a second close-up image on the second panoramic image, capture the second local area from the second panoramic image, to obtain a second local image, and adjust a size of the second local image to be the same as a size of the second difference image, to obtain a second enlarged image. The close-up image recovery module 28 is configured to determine the second close-up image based on the second enlarged image and the second difference image. The stable frame rate output module 29 is configured to control a quantity of frames of each image stream sent to the data output module 30 in a same time period to be the same. The data output module 30 is configured to send each image stream to the camera application, and the camera application 24 is configured to display each image stream.

Figure 19:
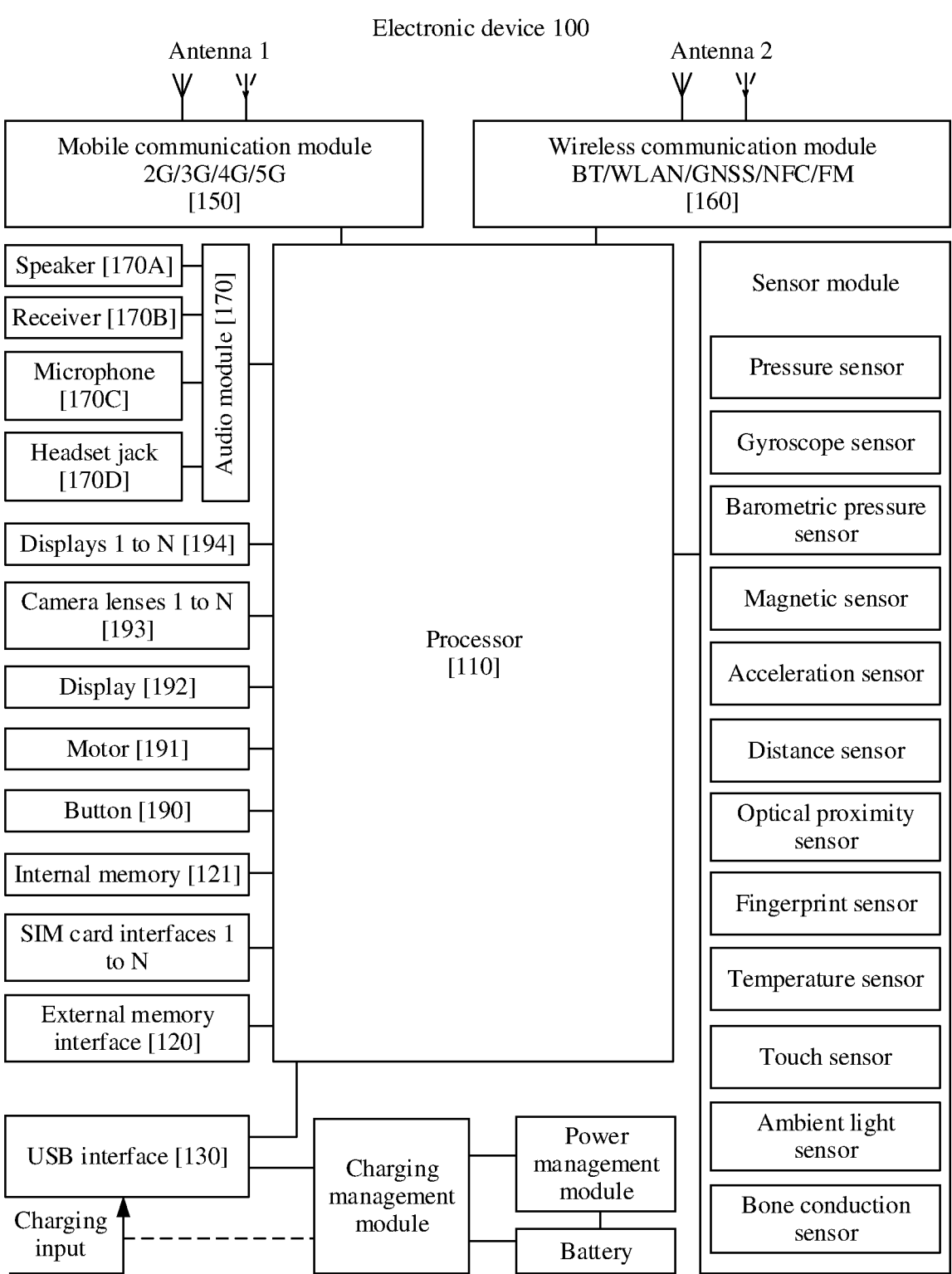
FIG. 19 is a schematic diagram of a structure of an electronic device 100 according to an embodiment of this application.

FIG. 19 is a schematic diagram of a structure of an electronic device 100. Both the remote device 10 and the local device 20 may use the structure shown in FIG. 15.

The electronic device 100 may include a processor 110, an external memory interface 120, an internal memory 121, a universal serial bus (universal serial bus, USB) interface 130, an antenna 1, an antenna 2, a mobile communication module 150, a wireless communication module 160, an audio module 170, a speaker 170A, a receiver 170B, a microphone 170C, a headset jack 170D, a button 190, a motor 191, an indicator 192, a camera lens 193, and a display 194.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate components, or may be integrated into one or more processors.

The controller may generate an operation control signal based on an instruction operation code and a time sequence signal, and complete control of instruction fetching and instruction execution.

A memory may be further disposed in the processor 110, and is configured to store instructions and data. The instructions include instructions corresponding to the method provided in this embodiment of this application. When executing the instructions, the processor 110 may implement the steps in each flowchart.

In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. Repeated access is avoided, and waiting time of the processor 110 is reduced. This improves system efficiency.

When the remote device 10 uses the structure shown in FIG. 19, a video encoder includes the encoding module 17 in FIG. 18A. When the local device 20 uses the structure shown in FIG. 19, a video decoder includes the decoding module 26 in FIG. 18B.

The camera lens 193 may include a wide-angle camera lens, a primary camera lens, and/or a telephoto camera lens.

The foregoing descriptions are merely specific implementations of this application, but are not intended to limit the protection scope of this application. Any variation or replacement readily figured out by a person skilled in the art within a technical scope disclosed in this application shall fall within the protection scope of this application. Therefore, the protection scope of this application shall be subject to the protection scope of the claims.

What is claimed is:

1. An encoding method, applied to a first device, wherein the method comprises:

enabling a first camera lens in the first device and a second camera lens in the first device after an image shooting instruction sent by a second device is received, wherein the first camera lens is configured to collect a first panoramic image stream, wherein the second camera lens is configured to collect a first close-up image stream, and wherein a picture of each close-up image in the first close-up image stream is a close-up of a local area on a synchronously collected panoramic image;

encoding a first panoramic image to obtain a first compressed image, wherein the first panoramic image is any image in the first panoramic image stream;

obtaining a first difference image based on the first panoramic image and a first close-up image, wherein the first close-up image is an image that is in the first close-up image stream and that is collected synchronously with the first panoramic image;

encoding the first difference image to obtain a second compressed image; and sending the first compressed image and the second compressed image to the second device.

2. The method according to claim 1, wherein the obtaining the first difference image based on the first panoramic image and the first close-up image comprises:

determining a first local area corresponding to the first close-up image on the first panoramic image;

obtaining a first local image by capturing the first local area from the first panoramic image;

obtaining a first enlarged image by adjusting a size of the first local image to be the same as a size of the first close-up image; and determining the first difference image based on the first enlarged image and the first close-up image.

3. The method according to claim 2, wherein the determining the first local area corresponding to the first close-up image on the first panoramic image comprises:

determining the first local area based on relative positions of the first camera lens and the second camera lens, a zoom multiple of the first camera lens, and a zoom multiple of the second camera lens.

4. The method according to claim 3, wherein the determining the first local area based on relative positions of the first camera lens and the second camera lens, the zoom multiple of the first camera lens, and the zoom multiple of the second camera lens comprises:

determining whether the relative positions change; and determining, based on the relative positions changing, the first local area using an image recognition algorithm;

determining, based on the relative positions not changing, whether the zoom multiple of the first camera lens and the zoom multiple of the second camera lens change;

determining, based on one of the zoom multiple of the first camera lens changing or the zoom multiple of the second camera lens changing, the first local area based on a current zoom multiple of the first camera lens and a current zoom multiple of the second camera lens; and determining, based on neither the zoom multiple of the first camera lens changing nor the zoom multiple of the second camera lens changing, the first local area based on a first area, wherein the first area is a local area corresponding to a previous-frame image of the first close-up image on a previous-frame image of the first panoramic image.

5. The method according to claim 4, wherein the determining the first local area based on the current zoom multiple of the first camera lens and the current zoom multiple of the second camera lens comprises:

determining the first local area based on a central point of the first panoramic image, the size of the first close-up image, the current zoom multiple of the first camera lens, and the current zoom multiple of the second camera lens.

6. The method according to claim 4, wherein the determining the first local area based on the current zoom multiple of the first camera lens and the current zoom multiple of the second camera lens comprises:

determining the first local area based on the first area, the current zoom multiple of the first camera lens, and the current zoom multiple of the second camera lens.

7. The method according to claim 2, wherein the determining the first difference image based on the first enlarged image and the first close-up image comprises:

determining a difference between color values of pixels based on color values of pixels on the first close-up image and color values of pixels on the first enlarged image; and obtaining the first difference image based on the difference between color values of pixels.

8. A decoding method, comprising:

decoding a first compressed image to obtain a second panoramic image, wherein the first compressed image is an encoded representation of a first panoramic image in a first panoramic image stream;

decoding a second compressed image to obtain a second difference image, wherein the second compressed image is an encoded representation of a first difference image, the first difference image is based on the first panoramic image and a first close-up image, and the first close-up image is an image in a first close-up image stream that is synchronous with the first panoramic image; and obtaining a second close-up image based on the second panoramic image and the second difference image, wherein obtaining the second close-up image based on the second panoramic image and the second difference image comprises:

determining a second local area corresponding to the second close-up image on the second panoramic image;

obtaining a second local image by capturing the second local area from the second panoramic image;

obtaining a second enlarged image by adjusting a size of the second local image to be the same as a size of the second difference image; and determining the second close-up image based on the second enlarged image and the second difference image.

9. The method according to claim 8, wherein the method further comprises:

receiving first local area information sent by a first device; and wherein the determining the second local area corresponding to the second close-up image on the second panoramic image comprises:

determining the second local area based on the first local area information.

10. The method according to claim 8, wherein the method further comprises:

receiving a current zoom multiple of a first camera lens and a current zoom multiple of a second camera lens sent by a first device; and wherein the determining the second local area corresponding to the second close-up image on the second panoramic image comprises:

determining the second local area based on the current zoom multiple of the first camera lens and the current zoom multiple of the second camera lens.

11. The method according to claim 10, wherein the determining the second local area based on the current zoom multiple of the first camera lens and the current zoom multiple of the second camera lens comprises:

determining the second local area based on a central point of the second panoramic image, the size of the second difference image, the current zoom multiple of the first camera lens, and the current zoom multiple of the second camera lens.

12. The method according to claim 10, wherein the determining the second local area based on the current zoom multiple of the first camera lens and the current zoom multiple of the second camera lens comprises:

determining the second local area based on a second area, the current zoom multiple of the first camera lens, and the current zoom multiple of the second camera lens, wherein the second area is a local area corresponding to a previous-frame image of the second close-up image on a previous-frame image of the second panoramic image.

13. The method according to claim 8, wherein the determining the second close-up image based on the second enlarged image and the second difference image comprises:

determining at least one of a difference or a sum of color values of pixels based on color values of pixels on the second difference image and color values of pixels on the second enlarged image; and obtaining the second close-up image based on the at least one of the difference or the sum of color values of pixels.

14. The method according to claim 8, wherein the first panoramic image is obtained by a first camera lens and the first close-up image is obtained by a second camera lens.

15. An electronic device, comprising:

a first camera lens, wherein the first camera lens is configured to collect a first panoramic image stream;

a second camera lens, wherein the second camera lens is configured to collect a first close-up image stream, and wherein a picture of each close-up image in the first close-up image stream is a close-up of a local area on a synchronously collected panoramic image;

a processor; and a non-transitory computer-readable storage medium storing a program to be executed by the processor, the program including instructions for:

enabling the first camera lens and the second camera lens after an image shooting instruction sent by a second device is received;

encoding a first panoramic image to obtain a first compressed image, wherein the first panoramic image is any image in the first panoramic image stream;

obtaining a first difference image based on the first panoramic image and a first close-up image, wherein the first close-up image is an image that is in the first close-up image stream and that is collected synchronously with the first panoramic image;

encoding the first difference image to obtain a second compressed image; and sending the first compressed image and the second compressed image to the second device.

16. The electronic device according to claim 15, wherein the obtaining the first difference image based on the first panoramic image and the first close-up image comprises:

determining a first local area corresponding to the first close-up image on the first panoramic image;

obtaining a first local image by capturing the first local area from the first panoramic image;

obtaining a first enlarged image by adjusting a size of the first local image to be the same as a size of the first close-up image; and determining the first difference image based on the first enlarged image and the first close-up image.

17. The electronic device according to claim 16, wherein the determining the first local area corresponding to the first close-up image on the first panoramic image comprises:

determining the first local area based on relative positions of the first camera lens and the second camera lens, a zoom multiple of the first camera lens, and a zoom multiple of the second camera lens.

18. The electronic device according to claim 17, wherein the determining the first local area based on relative positions of the first camera lens and the second camera lens, the zoom multiple of the first camera lens, and the zoom multiple of the second camera lens comprises:

determining whether the relative positions change; and determining, based on the relative positions changing, the first local area by using an image recognition algorithm;

determining, based on the relative positions not changing, whether the zoom multiple of the first camera lens and the zoom multiple of the second camera lens change;

determining, based on at least one of the zoom multiple of the first camera lens changing or the zoom multiple of the second camera lens changing, the first local area based on a current zoom multiple of the first camera lens and a current zoom multiple of the second camera lens; and determining, based on neither the zoom multiple of the first camera lens changing nor the zoom multiple of the second camera lens changing, the first local area based on a first area, wherein the first area is a local area corresponding to a previous-frame image of the first close-up image on a previous-frame image of the first panoramic image.

19. The electronic device according to claim 18, wherein the determining the first local area based on the current zoom multiple of the first camera lens and the current zoom multiple of the second camera lens comprises:

determining the first local area based on a central point of the first panoramic image, the size of the first close-up image, the current zoom multiple of the first camera lens, and the current zoom multiple of the second camera lens.

20. The electronic device according to claim 18, wherein the determining the first local area based on the current zoom multiple of the first camera lens and the current zoom multiple of the second camera lens comprises:

determining the first local area based on the first area, the current zoom multiple of the first camera lens, and the current zoom multiple of the second camera lens.

\* \* \* \* \*